United States Patent
Khalid et al.

(10) Patent No.: US 11,368,853 B2
(45) Date of Patent: Jun. 21, 2022

(54) METHODS AND APPARATUS FOR SERVICE PROVISION TO OUT-OF-COVERAGE APPARATUS IN WIRELESS SYSTEMS

(71) Applicant: Charter Communications Operating, LLC, St. Louis, MO (US)

(72) Inventors: Saran Khalid, Denver, CO (US); MohammedYusuf Shaikh, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/738,889

(22) Filed: Jan. 9, 2020

(65) Prior Publication Data
US 2021/0219143 A1    Jul. 15, 2021

(51) Int. Cl.
| | |
|---|---|
| *H04W 16/14* | (2009.01) |
| *H04W 72/04* | (2009.01) |
| *H04W 76/27* | (2018.01) |
| *H04W 8/00* | (2009.01) |
| *H04W 4/70* | (2018.01) |

(52) U.S. Cl.
CPC ............ *H04W 16/14* (2013.01); *H04W 4/70* (2018.02); *H04W 8/005* (2013.01); *H04W 72/0453* (2013.01); *H04W 76/27* (2018.02)

(58) Field of Classification Search
CPC ....... H04W 16/14; H04W 4/70; H04W 76/27; H04W 8/005; H04W 72/0453
See application file for complete search history.

(56) References Cited

U.S. PATENT DOCUMENTS

| | | |
|---|---|---|
| 2003/0146826 A1 | 8/2003 | Viana et al. |
| 2005/0186956 A1* | 8/2005 | Grindahl ............... H04W 84/14 455/422.1 |
| 2010/0094956 A1 | 4/2010 | Zuckerman et al. |
| 2011/0014924 A1 | 1/2011 | Hwang et al. |

(Continued)

OTHER PUBLICATIONS

3GPP, "Technical Specification—3rd Generation Partnership Project, Technical Specification Group Services and System Aspects, Telecommunication Management, Charging management, Proximity-based services (ProSe) charging (Release 14)," TS 32.277, V14.0.0, Sep. 2016, 91 pages.
3GPP TR 36.746 V15.0.0 (Sep. 2017), "3rd Generation Partnership Project; Technical Specification Group Radio Access Network; Study On Further Enhancements to LTE Device to Device (D2D), User Equipment (UE) to Network Relays for Internet of Things (IoT) and Wearables; (Release 15)", 56 pages.

(Continued)

*Primary Examiner* — Dai Phuong
(74) *Attorney, Agent, or Firm* — Gazdzinski & Associates, PC

(57) ABSTRACT

Methods and apparatus for provision of resources from one or more devices within a wireless communication network to one or more devices that are outside of the wireless communication network. In one embodiment, the methods and apparatus utilize so-called "quasi-licensed" CBRS (Citizens Broadband Radio Service) wireless spectrum in conjunction with a cellular wireless communication network (e.g. 4G, 5G, or LTE-based) for the delivery of services to a number of installed fixed wireless apparatus (CPE/FWA) at user or subscriber premises. The CPE/FWAs may act as relays and/or supplementation devices to provide service to the CPEs that are out of the network coverage, effectively enabling addition of new customers to the network. As such, additional CAPEX (capital expenditure) on infrastructure is largely avoided.

22 Claims, 30 Drawing Sheets

(56) References Cited

U.S. PATENT DOCUMENTS

| | | | |
|---|---|---|---|
| 2014/0194068 A1 | 7/2014 | Coppage et al. | |
| 2015/0229564 A1* | 8/2015 | Hong | H04L 45/7457 370/328 |
| 2016/0062242 A1 | 3/2016 | Hamaguchi et al. | |
| 2016/0066242 A1 | 3/2016 | Su et al. | |
| 2016/0149622 A1 | 5/2016 | Ma | |
| 2016/0150415 A1 | 5/2016 | Laneman et al. | |
| 2016/0212031 A1 | 7/2016 | Jain et al. | |
| 2017/0140073 A1 | 5/2017 | Chakraborty et al. | |
| 2018/0343567 A1 | 11/2018 | Ashrafi | |
| 2019/0319814 A1 | 10/2019 | Das | |
| 2019/0364435 A1 | 11/2019 | Ahmavaara | |
| 2020/0092712 A1* | 3/2020 | Zhao | H04L 67/303 |
| 2020/0169339 A1* | 5/2020 | Patel | H04W 16/20 |
| 2020/0221518 A1 | 7/2020 | Schmitz et al. | |
| 2020/0344515 A1 | 10/2020 | Wong et al. | |
| 2021/0076223 A1* | 3/2021 | Taneja | H04W 24/08 |
| 2021/0084658 A1* | 3/2021 | Sheriff | H04W 76/10 |
| 2021/0185541 A1* | 6/2021 | Potharaju | H04W 76/27 |

OTHER PUBLICATIONS

3GPP., TS 23.303 V12.0.0 (Feb. 2014), "3rd Generation Partnership Project; Technical Specification Group Services and System Aspects; Proximity-based Services (ProSe), Stage 2 (Release 12)", 53 pages.

3GPP TS 38.473 V15.A.A (Apr. 2018) 3rd Generation Partnership Project; Technical Specification Group Radio Access Network; NG-RAN; F1 application protocol (F1AP) (Release 15), 106 pages.

3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.

Article 5 of the Radio Regulations (edition 2001), Introduction to International Radio Regulations, 161 pages.

Deering, S., et al., "Internet Protocol, Version 6 (IPv6) Specification", Internet Engineering Task Force (IETF), Dec. 1998, 39 pages.

"Internet Protocol, DARPA Internet Program, Protocol Specification", IETF RCF 791, Sep. 1981, 50 pages.

Nokia 5G New Radio (NR): Physical Layer Overview and Performance, IEEE Communication Theory Workshop, 2018 by A. Ghosh, May 15, 2018, 38 pages.

* cited by examiner

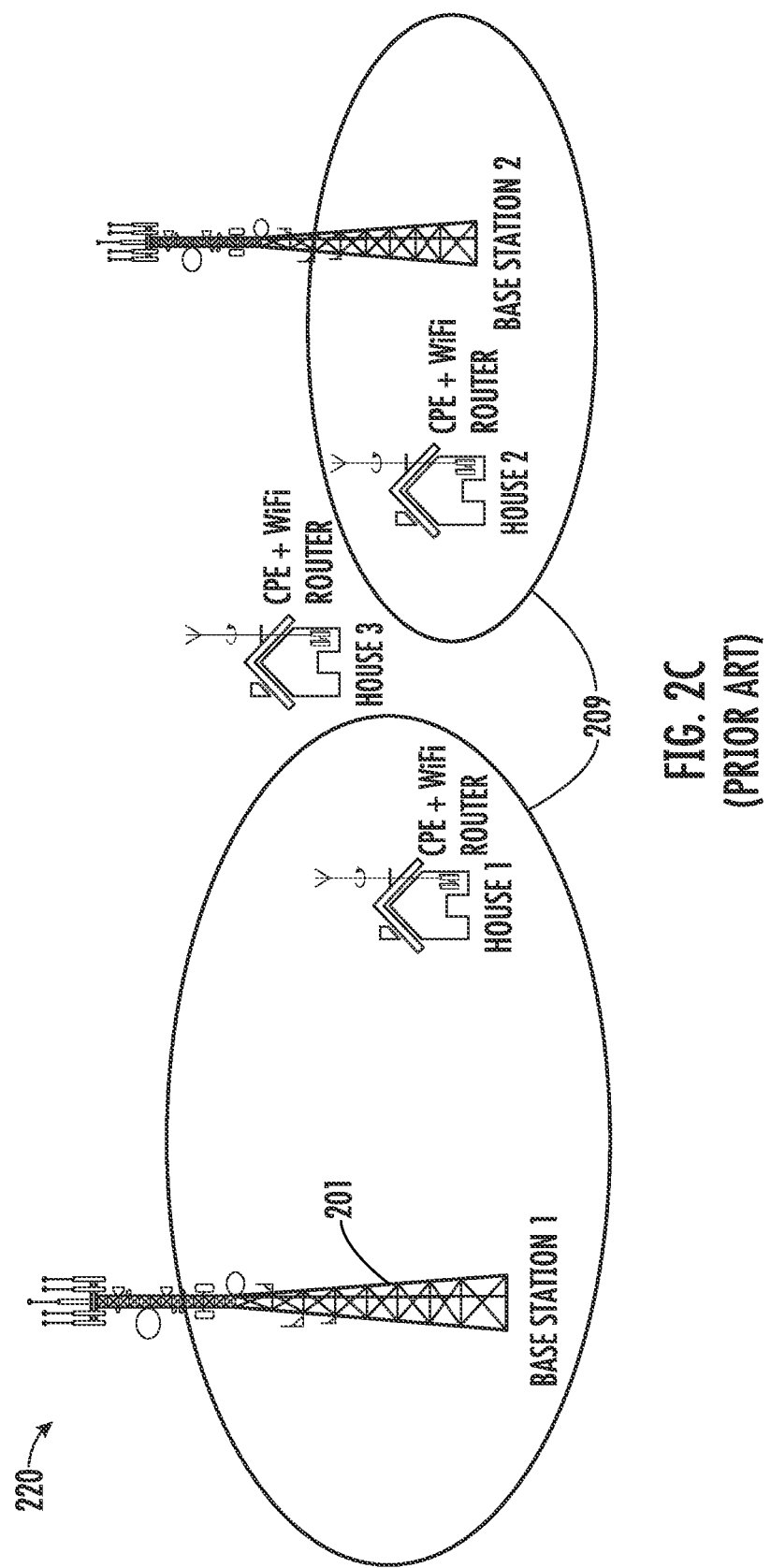

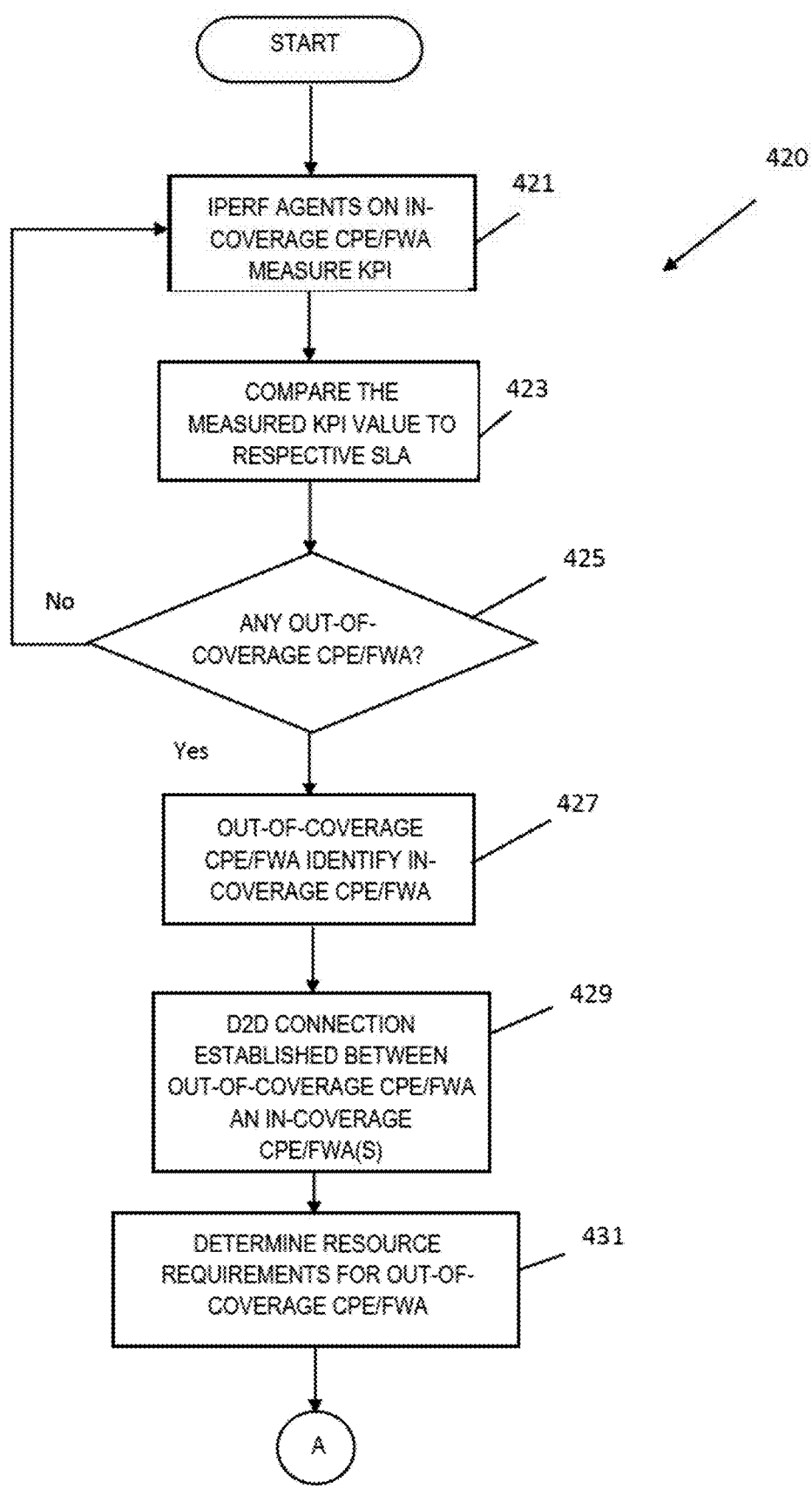

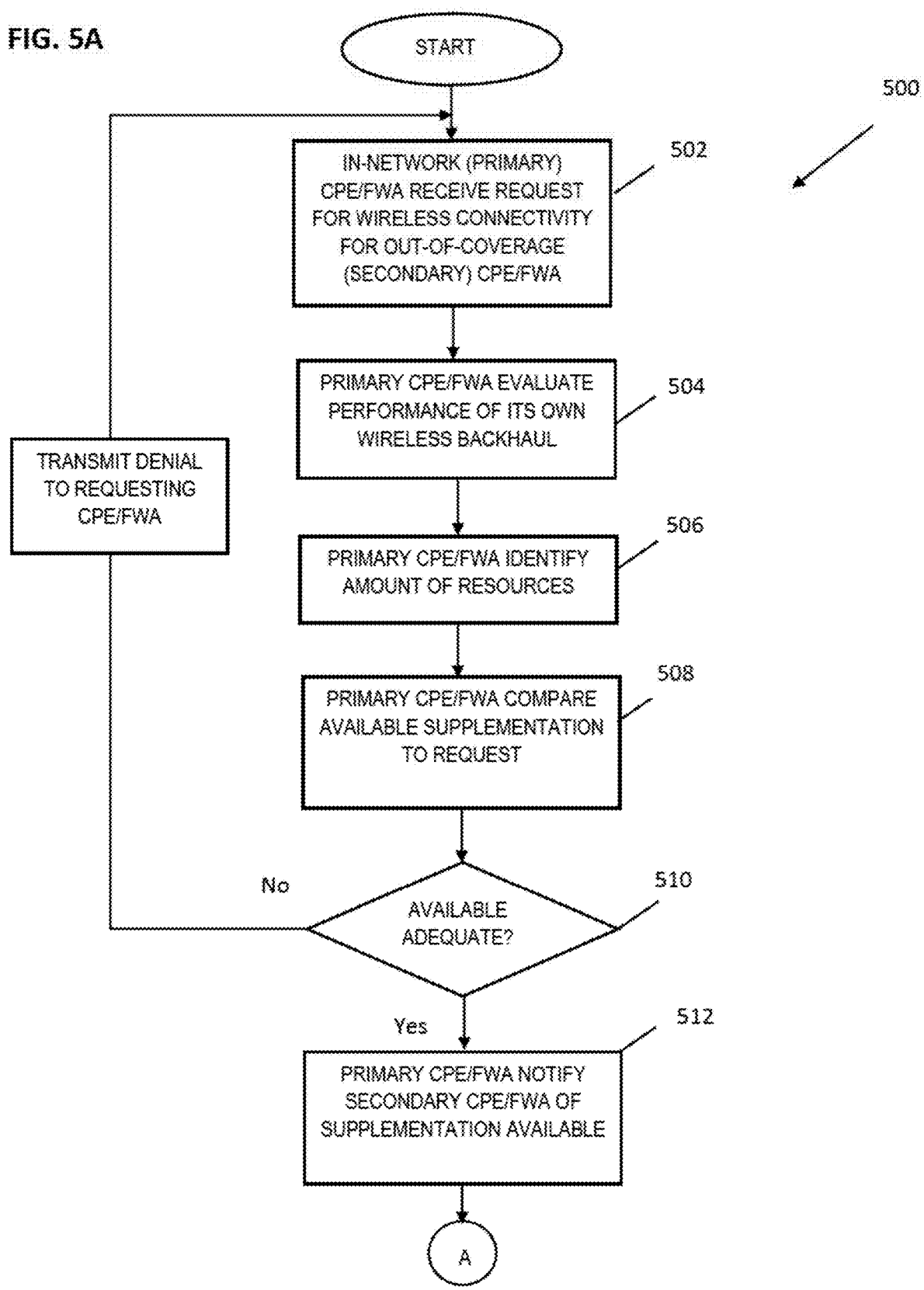

| Secondary CPE (ID) | Primary 1 | Primary 2 | Primary 1 status | Primary 2 status | Other CPEs discovered | Primary CPE SLA | Primary CPE SLA | Secondary CPE SLA | Secondary to Primary 1 Channel conditions and network KPIs | Secondary to Primary 2 Channel conditions and network KPIs |
|---|---|---|---|---|---|---|---|---|---|---|
| CPE 3 (ID) | CPE 1(ID) | CPE 2(ID) | active | active | inactive | 25/3 Mbps | 25/3 Mbps | 25/3 Mbps | ..... | ..... |

FIG. 5C

METHODS AND APPARATUS FOR SERVICE PROVISION TO OUT-OF-COVERAGE APPARATUS IN WIRELESS SYSTEMS

RELATED APPLICATIONS

The subject matter of this application is generally related to co-owned and co-pending U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary aspects, to methods and apparatus for "relaying" signals from one or more devices utilizing radio frequency spectrum to provide high-speed data services to out-of-network devices, such as for example those providing connectivity via technologies such as Citizens Broadband Radio Service (CBRS), LSA (Licensed Shared Access), TVWS, or Dynamic Spectrum Allocation (DSA).

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |

TABLE 2-continued

| Frequency range | Type | Center frequency | Availability | Licensed users |
| --- | --- | --- | --- | --- |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
| --- | --- | --- |
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider. Comparable technologies are in development, including for instance DSA, TVWS TV White Space), and LSA (Licensed Spectrum Access).

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2A.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 210 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

FIG. 2B illustrates a typical prior art CBRS-based CPE (consumer premises equipment)/FWA architecture 200 for a served premises (e.g., user residence), wherein the CPE/FWA 203 is backhauled by a base station (e.g., eNB) 201. A PoE (Power over Ethernet) injector system 204 is used to power the CPE/FWA 203 as well as provide Ethernet (packet connectivity for the CPE/FWA radio head to the home router 205.

Disabilities with CPE Coverage—

Extant CBRS architectures, while useful from many standpoints, currently lack mechanisms for providing the requisite data-rates to a given CPE (such as a premises Fixed Wireless Access or FWA device) that is outside of a cell coverage area (and accordingly which receives no downlink (DL) or uplink (UL) signals), as is shown in FIG. 2C. In particular, in the typical CBRS network, there may be one or more CPE/FWA (e.g., House 3 shown in FIG. 2C) that is out of the coverage area or cell 209 of a wireless network (e.g., one using CBRS spectrum) due to e.g., path loss and/or interference from being distant from the serving base station, obstruction to line-of-sight between CPEs and base stations, interference from other cells, etc.

In the architecture 220 shown in FIG. 2C, the "out-of-coverage" or OOC premises is also typically in a more remote area and/or not served by any alternate service provider capability of sufficient bandwidth (e.g., DOCSIS HFC cable drop, fiber, satellite dish, etc.) such that the use of the CBRS wireless backhaul shown is required for delivery of high-speed broadband services.

One prospective cure to this problem (at least for the DL) is to simply raise base station transmitter EIRP. A base station such as 3GPP eNB or gNB is limited in data throughput and area coverage in an interference-limited environment, due to the link budget limitations and the efficiency of the hardware components of its radio unit(s). To provide the requisite high level of performance (consistent with the aforementioned SLA) and greater coverage area, a single base station serving a CPE/FWA device has to transmit on comparatively higher power. However, such high power operation will violate the radio requirements (e.g., maximum transmit power and spectral masks) enforced in the 3GPP/CBRS specifications.

Technologies such as (i) use of a high device antenna gain; (ii) use of Multiple-Input-Multiple-Output (MIMO) system; (iii) Orthogonal Frequency Division Multiplexing (OFDM) (iv) advanced error control coding (e.g. Low Density Parity Check Codes (LDPC) or Turbo codes) are known in the prior arts to increase the throughput and coverage area. All of these techniques, while effective and implemented in typical 3GPP-based systems underlying CBRS, do not inherently mitigate the effects of the channel loss and interference, thereby effectively limiting the maximum data rates that can be achieved under such prior art approaches while operating within the aforementioned power limitations.

Hence, to achieve provide service to clients that are out-of-coverage of existing systems such as those utilizing CBRS spectrum, improved apparatus and methods are needed. Such improved apparatus and methods would ideally support comparatively high levels of performance (e.g., data rates on both DL and UL) for out-of-coverage CPE/FWA devices without large capital expenditures (CAPEX) to install e.g., additional base stations in the coverage area, and/or utilization of (fully) licensed spectrum with prospectively higher transmit power limits. Advantageously, such a solution would effectively add more customers to the network, thereby potentially lowering the overall cost of operating the network and providing services to customers (including potentially reduced subscription fees).

SUMMARY

The present disclosure addresses the foregoing needs by providing, inter alia, methods and apparatus, for inter alia, "relaying" resources of a wireless network to CPE such as FWA devices that are outside of an extant coverage area of the wireless network.

In a first aspect of the disclosure, a method of operating a CPE such as a fixed wireless access (FWA) device is disclosed. In one embodiment, the method includes: causing discovery of a first FWA device that is outside a coverage area of a wireless network; identifying at least one second FWA device within the coverage area of the wireless network and capable of providing resources to the first FWA device; causing establishment of a wireless connection to the identified at least one second FWA device; and transacting data with the at least one second FWA device in order to cause provision of the resources to the first FWA device.

In one variant, the discovery includes use of a 3GPP-based D2D (device-to-device) protocol whereby nearby CPE/FWA can discover one another, whether by scheduled (Type 2B) or unscheduled (Type 1) approaches.

In another variant, the identifying of the at least one second FWA device within the coverage area of the wireless network and capable of providing the resources to the first FWA device includes determining that a data rate associated with the at least one second FWA device exceeds a prescribed service level agreement (SLA) requirement, the SLA between a subscriber of a network operator managing the wireless network and the network operator.

In yet another variant of the method, the method further includes: subsequent to receiving the resources at the first FWA device, conducting, at the first FWA device, an evaluation to determine an additional capacity that is required to be provided to the FWA device in order to meet or exceed an SLA associated therewith; receiving data from respective ones of a plurality of other FWA devices, the received data indicating a respective additional capacity capability; and based at least on the received data and the determined additional capacity, selecting the at least one other FWA device from the plurality of other FWA devices with which to establish the wireless connection.

In another variant of the method, the identifying at least one second FWA device capable of providing the resources to the first FWA device includes evaluating data regarding ones of a plurality of other FWA devices within wireless range of the first FWA device such that a device-to-device (D2D) connection can be established therebetween.

In a further variant of the method, the first FWA device is configured to operate within a frequency range between 3.550 and 3.70 GHz inclusive, and the causing establishment of a wireless connection to the identified at least one second FWA device includes causing a request to be issued to a SAS (spectrum allocation system) in data communication with the wireless network to obtain at least one spectrum grant, at least one frequency within the at least one spectrum grant being utilized to establish the wireless connection. In one such implementation, the method further includes receiving at the first FWA device data relating to the at least one spectrum grant from the identified at least one second FWA device, and utilizing the received data relating to the at least one spectrum grant in the establishment of the wireless connection.

In another such implementation, the method further includes receiving at the FWA device data relating to the at least one spectrum grant from another FWA device within the wireless network, and utilizing the received data relating to the at least one spectrum grant in the establishment of the wireless connection.

In still another implementation, the causing the request to be issued to the SAS in data communication with the wireless network to obtain the at least one spectrum grant includes causing the request to be transmitted from the first FWA device to the SAS via the at least one second FWA device utilizing a sidelink D2D connection between the first FWA device and the at least one second FWA device.

In a further implementation, the causing the request to be issued to the SAS in data communication with the wireless network to obtain the at least one spectrum grant includes causing the request to be initiated via the at least one second FWA device.

In another aspect of the disclosure, a computerized method of operating a first fixed wireless access (FWA) device that is outside a coverage area of a wireless network is disclosed. In one embodiment, the method includes; identifying a second FWA device within the coverage area of the wireless network and capable of providing resources to the first FWA device; causing establishment of a wireless connection to the identified second FWA device; and transacting data with the second FWA device in order to cause provision of the resources to the first FWA device from the wireless network via at least the second FWA device.

In one variant, the identifying of the second FWA device within the coverage area of the wireless network and capable of providing the resources to the first FWA device includes determining that a data rate associated with the second FWA device exceeds a prescribed threshold or requirement.

In another variant, the prescribed threshold or requirement is established to enable selection of the second FWA device from a plurality or potential candidate FWA devices, and the method further includes: subsequent to receipt of the resources at the first FWA device, conducting, at the first FWA device, an evaluation to determine an additional capacity that is required to be provided to the first FWA device; receiving data from respective ones of a plurality of other FWA devices, the received data indicating a respective additional capacity capability; and based at least on the received data and the determined required additional capacity, selecting the at least one other FWA device from the plurality of other FWA devices with which to establish a wireless connection.

In yet another variant, the identifying the second FWA device capable of providing the resources to the first FWA device includes evaluating data regarding ones of a plurality of other FWA devices within wireless range of the first FWA device such that an inter-device connection can be established therebetween. In one implementation, the establishment of the inter-device connection includes using 3GPP (Third Generation Partnership Project) D2D (device to device) protocols between the first FWA device and at least one other of the plurality of other FWA devices, the D2D protocols including at least synchronization within a CBRS (Citizens Broadband Radio Service) radio frequency band.

In a further variant, the first FWA device is configured to operate within a frequency range between 3.550 and 3.70 GHz inclusive, and the causing establishment of a wireless connection to the identified second FWA device includes causing a request to be issued to a SAS (spectrum allocation system) in data communication with the wireless network to obtain at least one spectrum grant, at least one frequency within the at least one spectrum grant being utilized to establish the wireless connection. In one implementation thereof, the method further includes: receiving at the first FWA device data relating to the at least one spectrum grant from the identified second FWA device; and utilizing the received data relating to the at least one spectrum grant in the establishment of the wireless connection.

In another implementation of the method, the causing the request to be issued to the SAS in data communication with the wireless network to obtain the at least one spectrum grant includes causing the request to be transmitted from the first FWA device to the SAS via the at least one second FWA device utilizing a sidelink connection between the first FWA device and the second FWA device.

In yet another implementation of the method, the causing the request to be issued to the SAS in data communication with the wireless network to obtain the at least one spectrum grant includes causing the request to be initiated from the second FWA device.

In still another variant, the causing the discovery of the first FWA device includes: causing at least one of the first FWA device or the second FWA device to transmit an announcement, the announcement configured to indicate to other FWA devices that the at least first or second FWA device exists; and based on the announcement by and receipt of at least one response thereto, causing the first FWA device to send data to the at least one second FWA device to cause the establishment of the wireless connection.

In another aspect of the disclosure, computerized premises apparatus for use in a wireless network is described. In one embodiment, the apparatus includes:

at least one wireless interface; processor apparatus in data communication with the at least one wireless interface; and storage apparatus in data communication with the processor apparatus.

In one variant, the storage apparatus comprises at least one computer program configured to, when executed by the processor apparatus: engage in communication with at least one wireless access device via utilization of a direct synchronization and discovery protocol, the at least one wireless access device within in wireless range of (i) the at least one wireless interface of the computerized premises apparatus and (ii) at least one base station; obtain first data from the at least one wireless access device enabling establishment of a first wireless connection, the first wireless connection between the computerized premises apparatus and the at least one wireless access device; utilize the at least one wireless access device to request a resource grant using the at least one base station; and based at least on a criterion relating to performance or capability of the at least one FWA device being exceeded, receive resources in accordance with the resource grant from the at least one FWA device.

In one implementation, the computerized premises apparatus and the at least one wireless access device each comprise a FWA (fixed wireless access) device configured to operate in a CBRS (citizens broadband radio service) frequency band, and the at least one base station includes a 3GPP-compliant NodeB (NB) configured to operate in a CBRS frequency band.

In another implementation, the at least one computer program is further configured to, when executed by the processor apparatus: determine that the first connection cannot meet a prescribed performance level requirement associated with the computerized premises apparatus based on the resources received from the at least one wireless access device; and based at least on the determination, cause a communication with at least one second wireless access device within wireless range of the computerized premises device to request supplementation of the wireless connection via a second wireless connection, the communication to request supplementation including data relating to an amount of bandwidth supplementation required by the computerized premises apparatus.

In one configuration, the at least one computer program is further configured to, when executed by the processor apparatus: utilize a transport layer process to enable aggregation of data packets transmitted to the computerized premises apparatus via the wireless connection and the second wireless connection when the wireless connection and the second wireless connection have been established.

In another configuration, the determination that the first connection cannot meet the prescribed performance level requirement associated with the computerized premises apparatus includes determination of the amount by a performance determination process operative to execute on the computerized premises apparatus, the determination process configured to measure at least one parameter related to data rate or throughput of the at least one wireless interface while utilizing the wireless connection.

In another variant of the computerized premises apparatus, the engagement includes utilization of a 3GPP D2D (Device to Device) protocol based on a schedule provided to at least the at least one wireless access device by the at least one base station.

In a different variant, the engagement includes utilization of a 3GPP D2D (Device to Device) protocol based on a discovery protocol initiated by the computerized premises apparatus.

In a further aspect of the disclosure, computer readable apparatus including a non-transitory storage medium, the non-transitory medium including at least one computer program having a plurality of instructions is disclosed. In one embodiment, the plurality of instructions are configured to, when executed on a processing apparatus: receive first data relating to a measurement of at least one first performance metric relating to a first wireless connection between a first computerized premises apparatus and a first base station, the first wireless connection used to provide first resources to the first computerized premises apparatus; and based on the at least one performance metric exceeding a first prescribed threshold, cause establishment a second wireless connection between the first computerized premises apparatus and a second computerized premises apparatus, the second wireless connection utilized for a provision of second resources to the second computerized premises apparatus.

In one variant, the plurality of instructions are configured to, when executed on the processing apparatus: receive second data relating to a measurement of at least one performance metric relating to the second wireless connection; receive third data relating to a measurement of at least one performance metric relating to a third wireless connection between a third computerized premises apparatus and either the first base station or a second base station; and based at least on (i) the second data indicating that the at least one second performance metric does not meet a second prescribed threshold, and (ii) the third data indicating that the at least one performance metric exceeds a third prescribed threshold, cause establishment of a fourth wireless connection between the first computerized premises apparatus and the third computerized premises apparatus, the fourth wireless connection utilized for a provision of third resources to the second computerized premises apparatus, the third resources supplementing the first and second resources such that the least one second actual performance metric at least meets the second prescribed threshold.

In another variant, the second computerized premises apparatus includes a FWA device that is (i) completely out of a coverage area of the first and second base stations and (ii) configured to operate in a CBRS (citizens broadband radio service) frequency band; the first and second base stations each comprise a 3GPP-compliant NodeB (NB) configured to operate in a CBRS frequency band; and each of the wireless connections each comprise operation in an RRC_Connected state.

In another aspect of the disclosure, computerized method of operating a fixed wireless access (FWA) device within a wireless network, is disclosed. In one embodiment, the method includes discovering a first FWA device that is outside a coverage area of the wireless network; transmitting performance data associate with a second FWA device to a computerized resource allocation process, the computerized resource allocation process configured to grant an amount of resources to the first FWA device; and based on receipt of the grant of the amount of the resources from the computerized resource allocation process, provide the amount of the resources to the first FWA device, thereby connecting the first FWA device to the wireless network via the second FWA device.

In one variant, the method further includes establishing a device-to-device (D2D) connection with first FWA device based on the discovery thereof. In one implementation, the D2D connection is based on a Type 2B D2D semi-persistent UE-specific allocation approach.

In yet another aspect of the disclosure, a method of operating a wireless network infrastructure is disclosed. In one embodiment, the method includes using one or more "relay" CPE disposed within a wireless network to provide data bandwidth to a target CPE disposed outside of the coverage of the fixed infrastructure of the wireless network.

In one variant, MSO customers with such relay or primary CPE/FWA ("anchor customers") within a given area may be given a differentiated set of services, privileges, subscription rates, or other features (including differentiated equipment capabilities/configurations) so as to incentivize such customers for maintaining the primary or relay CPE. For instance, in one implementation, primary or relay CPE are selected based on geographical/topological/signal propagation considerations, including proximity to one or more xNBs within the infrastructure, such that maximal impact or relay performance is enabled with respect to the largest possible number of other out-of-coverage subscribers.

In an additional aspect of the disclosure, computer readable apparatus is described. In one embodiment, the apparatus includes a storage medium configured to store one or more computer programs, such as on a fixed wireless receiver of a managed wireless network. In one embodiment, the apparatus includes a program memory or HDD or SDD and stores one or more computer programs supporting relaying of data from a serving base station and the recipient fixed wireless receiver via one or more other fixed wireless receivers.

In another aspect, methods and apparatus for communication coordination for delivery/receipt of wireless signals to/from one or more target CPE/FWA are disclosed. In one embodiment, the communication coordination includes data messaging between the one or more serving CPE/FWA and the first target CPE/FWA such that the signals associated with one or more serving devices may be used to provide services to the first target device.

In another aspect of the disclosure, methods and apparatus for differentiated spectrum allocation are described. In one embodiment, the methods and apparatus are configured to allocate one type or performance level of spectrum to one entity, and a second type/performance level of spectrum to another entity, based on e.g., the relationship of the two entities. For example, in one variant, a first CPE/FWA acting as a primary or relay device may request and/or be unilaterally allocated PAL spectrum, while a secondary CPE/FWA being served by the first is allocated GAA spectrum.

In yet a further aspect, improved proximity-based methods and apparatus useful within e.g., a quasi-licensed wireless system are disclosed.

In another aspect, methods and apparatus useful within e.g., a quasi-licensed wireless system for providing packet aggregation in support of multiple physical bearers utilizing a multi-stream capable protocol such as Stream Control Transmission Protocol (SCTP) are disclosed. In one variant, the protocol is non-blocking so as to avoid e.g., head of the line queuing of data packets and latency associated therewith.

In still a further aspect, methods and apparatus useful within e.g., a quasi-licensed wireless system for providing device to device (D2D) communication in support of relay or supplementation functions are disclosed.

In a further aspect, methods and apparatus for "repurposing" a D2D connection between two devices are disclosed. In one embodiment, the two devices include MSO-provided CBRS-enabled FWA, wherein the established D2D is used to supplement one of the FWA's from at least the other FWA.

In another aspect, network controller apparatus for enabling provision of services to out-of-coverage CPE is disclosed. In one embodiment, the controller is part of an MSO wireless network infrastructure. In one variant, the controller is integrated with or part of a 3GPP 5GC or EPC, and is communicative with logical processes on two or more CPE apparatus (via interposed RAN including Node B apparatus) to obtain performance data for scheduling/allocating network resources and the provision of services to out-of-coverage CPE.

In yet further aspects of the disclosure, methods and apparatus for both adding new customers to a service provider network without significant CAPEX are disclosed. In one embodiment, extant CPE and supporting infrastructure are configured to extend wireless coverage to new or incipient CPE to be added to the network which cannot otherwise be serviced by the infrastructure.

In yet another aspect, a multi-role CPE apparatus is disclosed. In one embodiment, the multi-role apparatus is configured to operate as both a CBRS FWA (i.e., consumer and low power transmitter of wireless data for support of broadband services to the CPE itself) in one role, and also as a higher-power CBSD and provider of services to one or more out-of-coverage CPE in a second role. In some variants, the roles may be intermixed, such as where the multi-role CPE operates in one frequency band (e.g., using one sector of its antennae) for communication with a serving base station, and another sector/sectors and/or frequency bands to communicate with the one or more OOC devices, including at power levels commensurate with classification/registration as a CBSD.

In yet another aspect, methods and apparatus for providing wireless service to an OOC CPE are disclosed. In one embodiment, the methods and apparatus utilize a first in-coverage or primary CPE using a first type of spectrum to provide service to the OOC CPE and, when the OOC CPE determines that it requires additional capacity from the primary CPE, requests such additional capacity. When the primary CPE (or network entity such as EPC or 5GC or MSO controller) determines that the primary CPE cannot provide the requested additional capacity using the first type of spectrum, utilization of a second type of spectrum is used by the primary CPE for at least its backhaul to its serving BS). In one variant, the first type of spectrum is CBRS GAA spectrum, and the second type is PAL, the latter having ostensibly much less interference due to its quasi-licensed status (at least for the duration of the grant of the PAL spectrum).

These and other aspects shall become apparent when considered in light of the disclosure provided herein.

BRIEF DESCRIPTION OF THE DRAWINGS

FIG. 2C is a graphical illustration of a prior art configuration for delivery of data from a base station to end-user devices (CPE/FWA) within the wireless coverage areas of the base station, and an exemplary premises (House 3) outside of the wireless coverage areas of the base stations.

FIGS. 4B and 4C illustrate a logical flow diagram of an exemplary implementation of the method of FIG. 4 according to the present disclosure, including use of performance monitoring software agents (e.g., iPerf applications).

FIGS. 5A and 5B illustrate a logical flow diagram illustrating another embodiment of a method of "relaying" data from one or more in-coverage CPE/FWA (e.g., high-TP or high-throughput CPE/FWA) to a CPE/FWA that is completely out of coverage of a wireless network, according to the present disclosure.

FIG. 5C is an exemplary table maintained by a network entity (e.g., EPC) for decision making when implementing e.g., the methods of FIGS. 4-5B.

FIGS. 1-5B and 7-15 ©Copyright 2019 Charter Communications Operating, LLC. All rights reserved.

DETAILED DESCRIPTION

Figure 1:
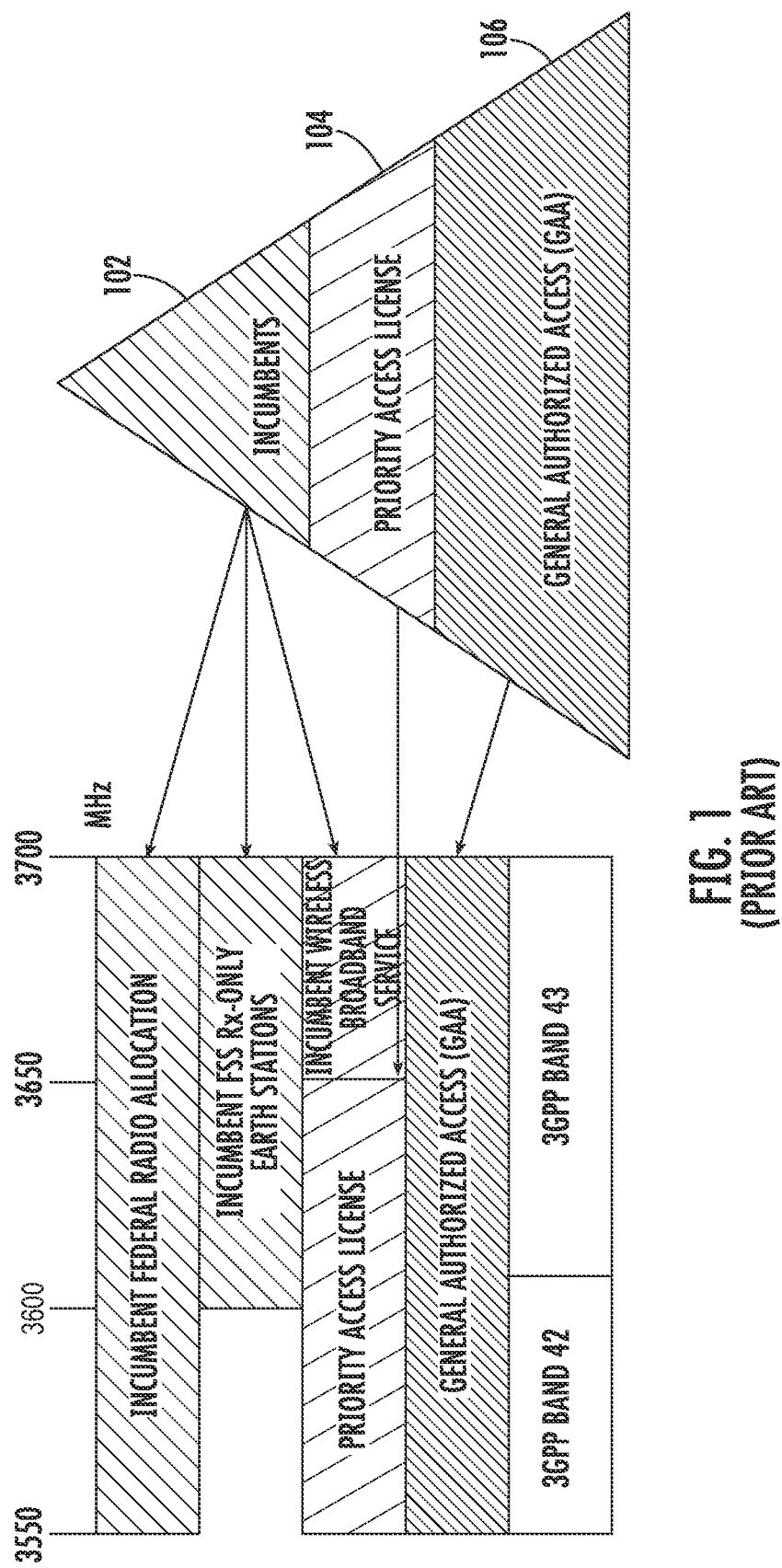
FIG. 1 is a graphical illustration of prior art CBRS (Citizens Broadband Radio Service) users and their relationship to allocated frequency spectrum in the 3.550 to 3.700 GHz band.

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband*

Radio Service (CBRS): Spectrum Access System (SAS)—Citizens Broadband Radio Service Device (CBSD) Interface Technical Specification—Document WINNF-TS-0016, Version V1.2.1. 3, Jan. 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "D2D" refers generally and without limitation to any mechanism for direct or indirect device-to-device communication of data, one exemplary instance of which is the 3GPP D2D protocols set forth in e.g., 3GPP Release 14.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LIE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides methods and apparatus for providing wireless coverage and data rates to at least one computerized user device (e.g., fixed wireless access consumer premises equipment or CPE/FWA) that is outside the coverage area of a wireless network via relaying network resources through one or more in-coverage CPE/FWA.

In one embodiment, the CPE/FWA are all configured to utilize "quasi-licensed" spectrum provided by the recent CBRS technology initiative via 3GPP-based infrastructure and protocols. One or more "in-coverage" CPE/FWA (i.e., those with sufficiently strong signals and data rates) are used as relays to provide requisite data rates to CPE that are "out-of-coverage" of a network (or are otherwise prevented from obtaining or establishing a signal or sufficiently strong signal, such as via topological obstructions, extended range from a base station, or other such phenomena), and accordingly cannot establish a connection (and accordingly meet any prescribed) user experience or service level agreement (SLA) requirements. In one variant, the each CPE/FWA have processes operative thereon (e.g., "iPerf" agents) that can measure key performance metrics or indicators (KPIs) such as data throughput (TP), latency, jitter, or BER. Participating or eligible CPE/FWA that, e.g., can sustain data rates higher than required by their own SLAs or requirements, can act as the relays for other CPE/FWA with no service, such that all the CPE/FWA can meet their performance requirements simultaneously (or at least are maximized in terms of performance relative to their prevailing respective SLAs).

In one implementation, the out-of-coverage or "secondary" CPE/FWA can search for and acquire in-coverage and/or over-performing CPE/FWA (aka "primary" CPE/FWA), and establish one or more Device-to-Device (D2D) connections to these primary CPE/FWA in order to receive (and subsequently supplement) signal being received by the secondary CPE via the primary CPE/FWA, the latter served directly from its/their serving base station (e.g., 3GPP eNB or gNB operating as a CBRS CBSD). Once the connection(s) is/are established, the secondary CPE can receive/transmit data from/to the participating primary CPEs. In one configuration, CBRS GAA and/or PAL spectrum is allocated to the primary and secondary CPE/FWA (such as by a request to a CBRS SAS) in order to support the additional D2D connection(s).

In another implementation, packets can be aggregated from multiple in-coverage and/or over-performing CPE via use of Stream Control Transmission Protocol (SCTP).

The exemplary embodiment described above effectively improves, inter alia, coverage area due to the gain and spatial diversity provided via relaying, without the need to use excessively large power at the serving transmitter (e.g., gNB/CBSD) and the various issues associated therewith. In one sense, the various aspects of the present disclosure allow for a more uniform RF energy distribution within a given region or geographic area via a type of ad hoc service from one or more primary nodes to one or more secondary nodes (which may vary with time) in contrast with merely increasing radiated power from one (or both) of communicating nodes.

In addition, the provision of enhanced signal quality in both uplink (UL) and downlink (DL) directions for the secondary CPE/FWA via relaying increases the network capacity without the need to install additional infrastructure such as CBSDs and associated backhaul, thereby effectively adding more customers to the network with a given CAPEX (capital expenditure).

The methods and apparatus described herein may also advantageously be extended to other shared-access architectures (i.e., other than CBRS) such as for example DSA, LSA, and TVWS systems.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned base station (e.g., 3GPP eNB or gNB) wireless access points using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104, including selective allocation based on e.g., role, functionality, resources, availability, subscription level, geographic/topological considerations, and/or other such factors.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a (fully) licensed spectrum context; e.g., for cellular voice or data bandwidth/spectrum allocation, such as in cases where a given service provider must alter its current allocation of available spectrum to users.

Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

It will also be appreciated that while the primary embodiments of the methods and apparatus described herein are cast in terms of provision of service to CPE/FWA which are completely out of coverage (i.e., cannot for all intents and purposes establish any useful connection with any base station due to e.g., heavy clutter, high levels of interference, topography, etc.), the various aspects of the disclosure may find utility in other types of applications, including e.g., those where intermittent connectivity can be established, but is unreliable or has other undesired attributes.

Other features and advantages of the present disclosure will immediately be recognized by persons of ordinary skill in the art with reference to the attached drawings and detailed description of exemplary embodiments as given below.

Relaying Architecture—

Figure 2:
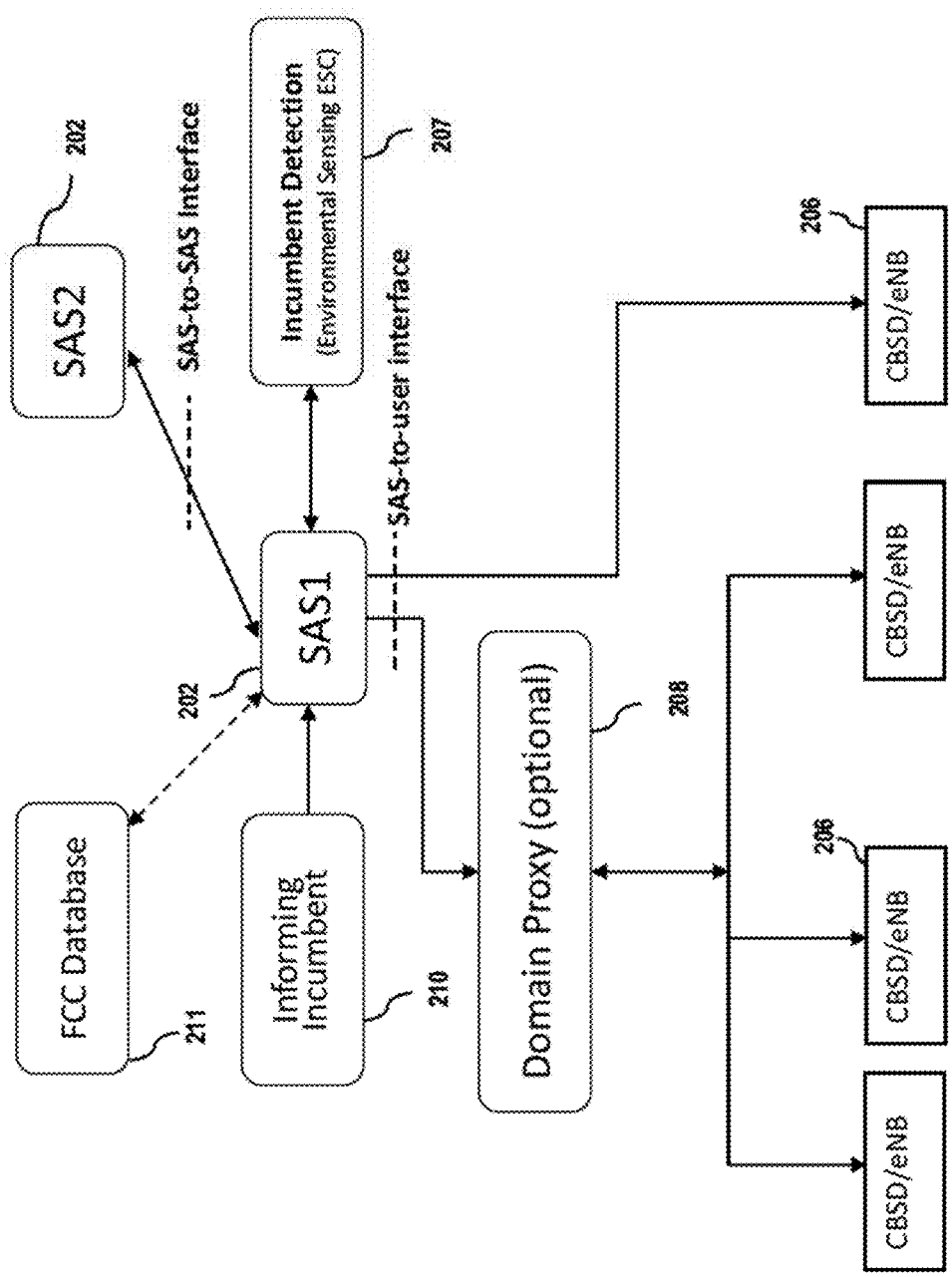
FIG. 2 is a block diagram illustrating a general architecture for the CBRS system of the prior art.
Figure 2A:
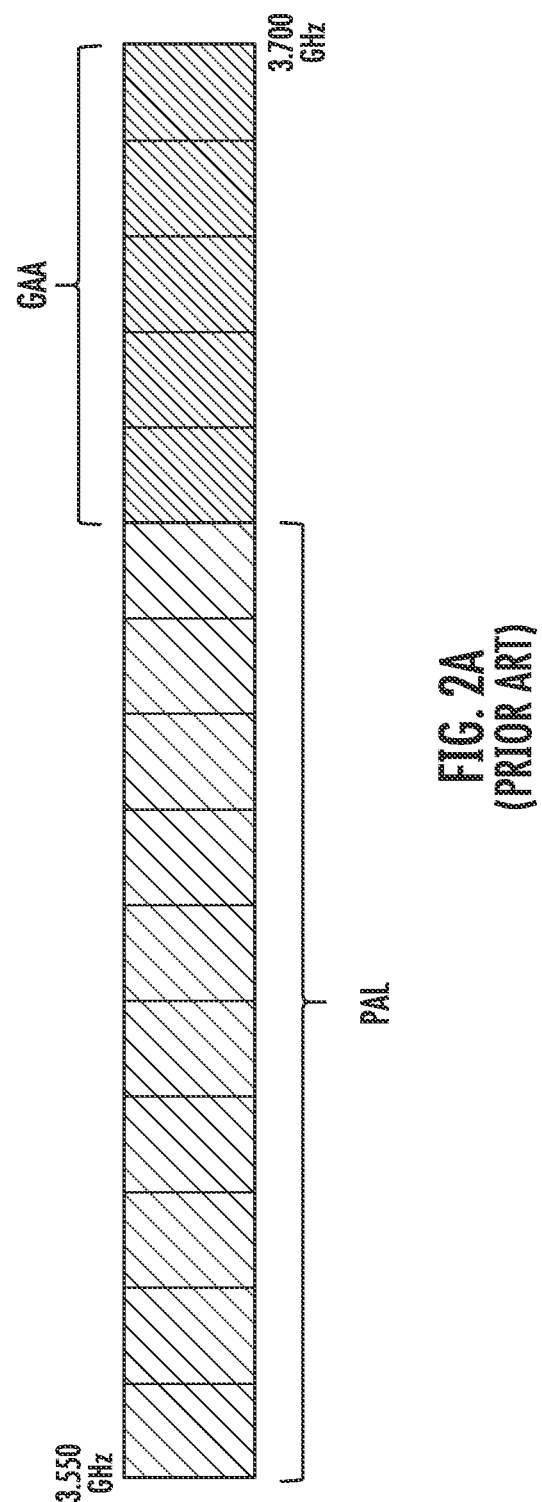
FIG. 2A is a graphical representation of allocations for PAL versus GAA users within the frequency band of FIG. 2.
Figure 2B:
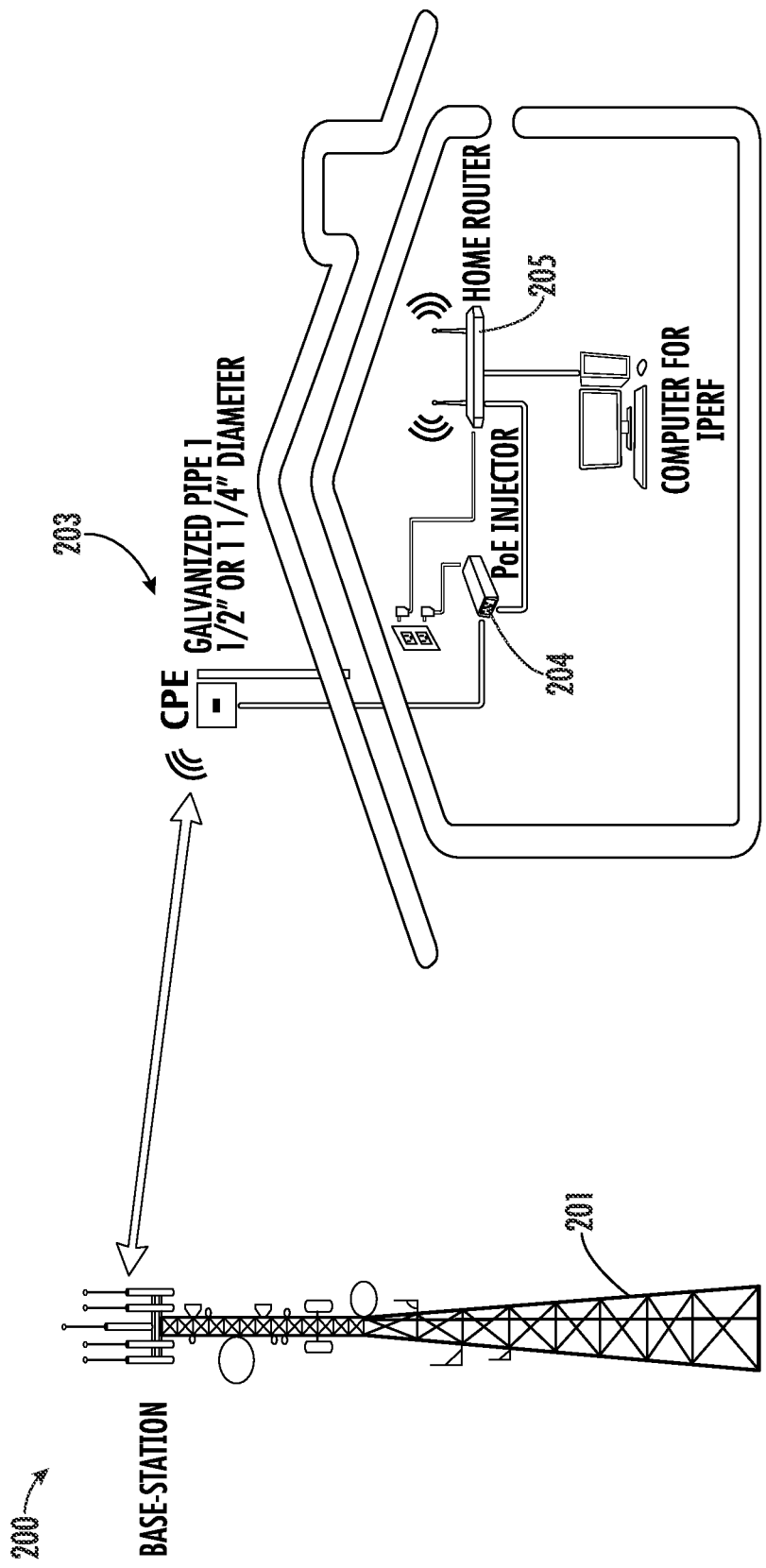
FIG. 2B is a graphical illustration of a prior art configuration for delivery of data from a base station to an end-user device (CPE/FWA) within the wireless coverage areas of the base station.
Figure 3:
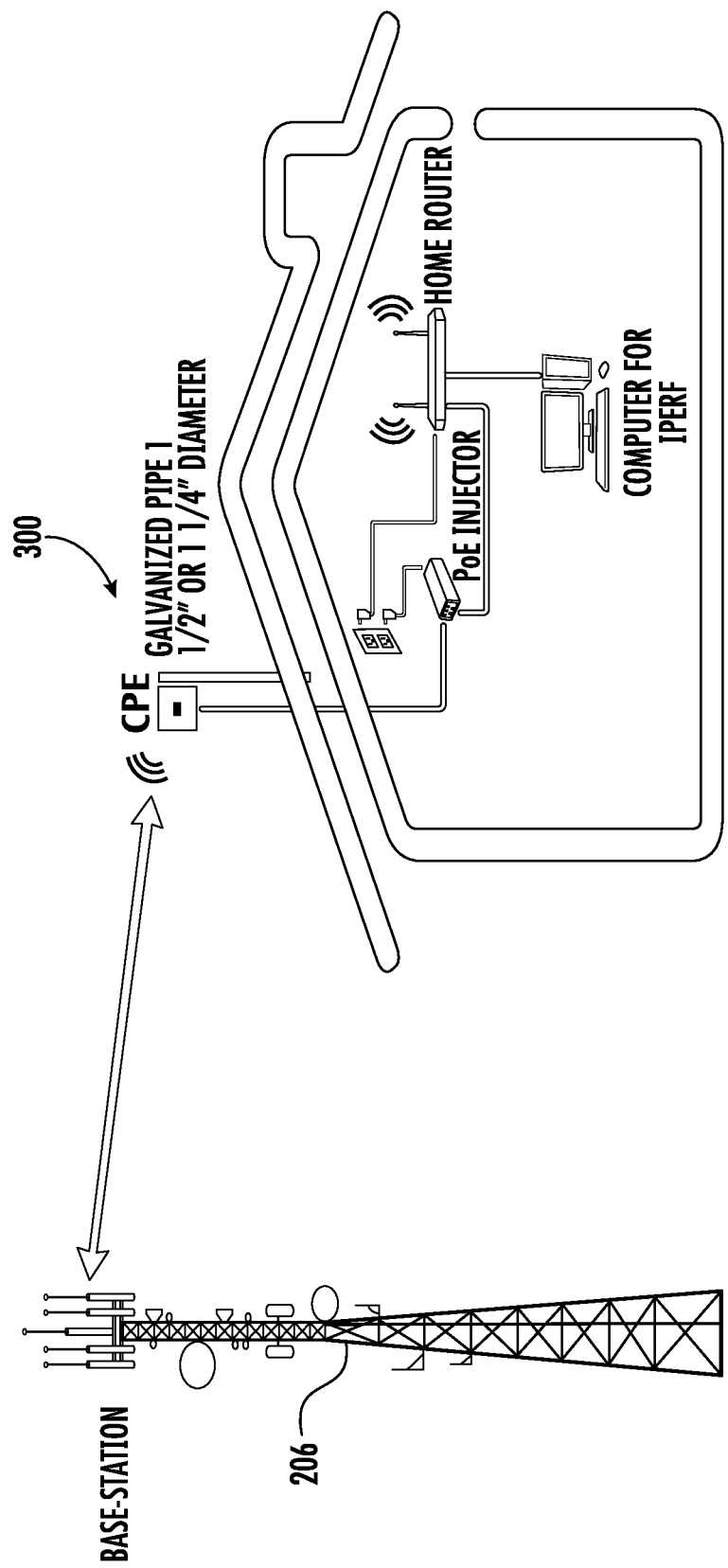
Figure 3A:
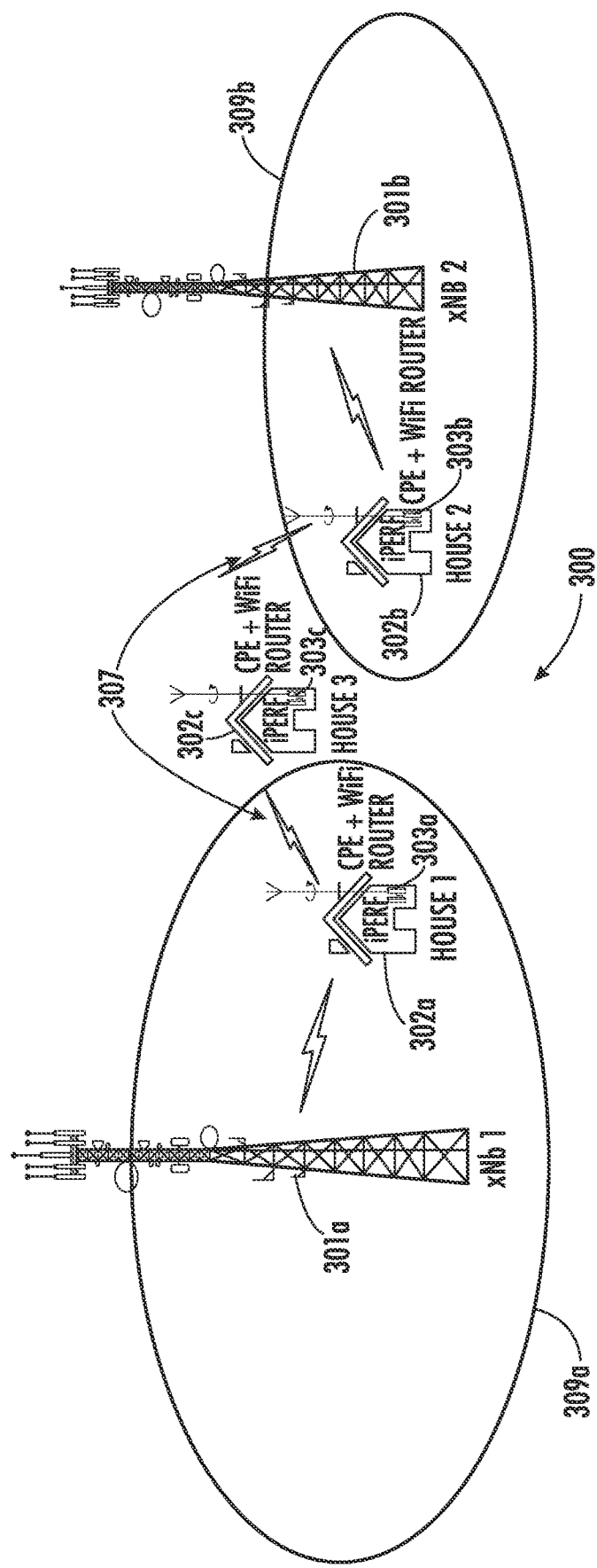
FIG. 3A is a graphical illustration of an exemplary configuration for "relaying" network resources to an out-of-coverage (OOC) CPE/FWA, according to one embodiment of the present disclosure.
Figure 3B:
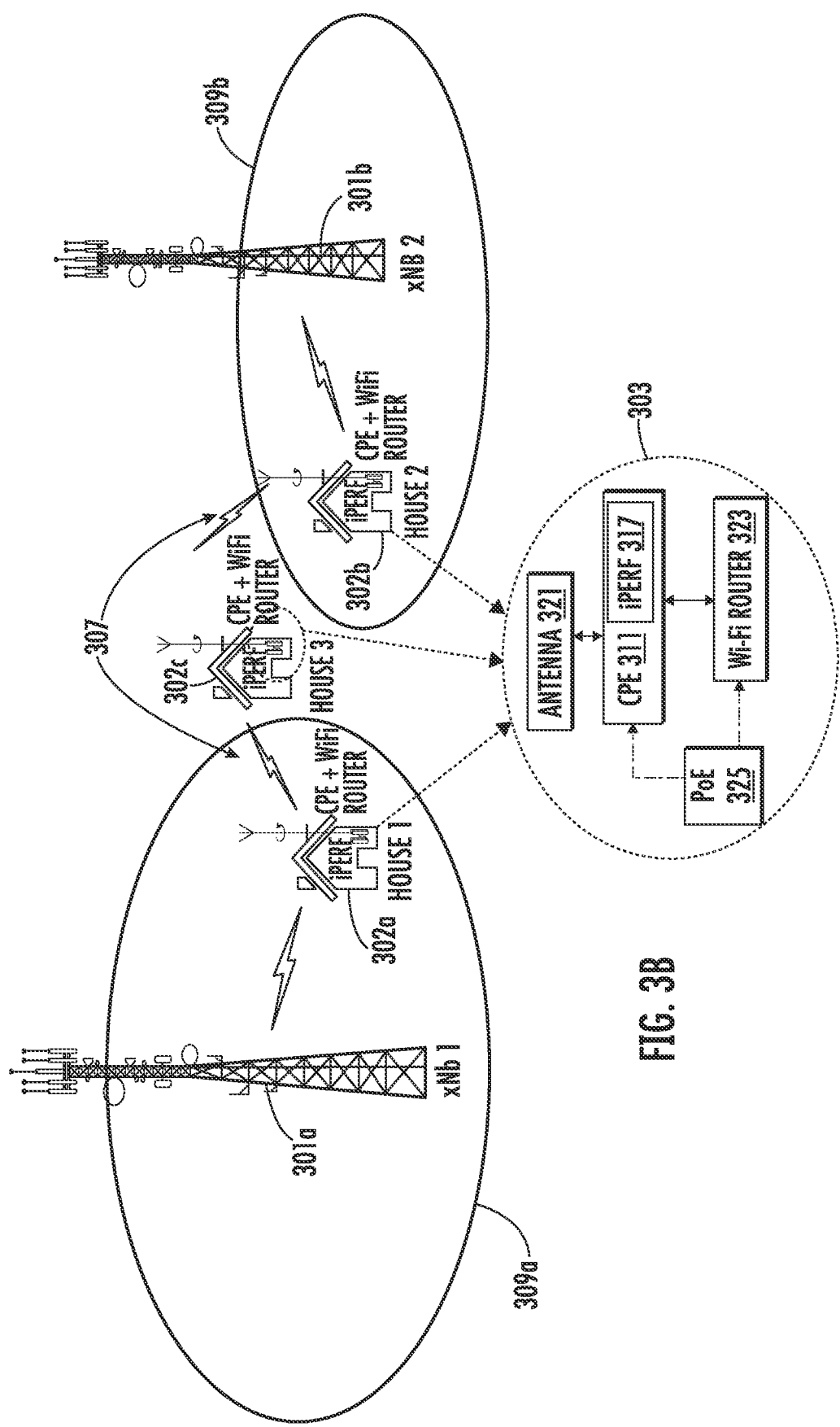
FIG. 3B shows the exemplary configuration for "relaying" network resources to the out-of-coverage CPE/FWA of FIG. 3A, with detail of the CPE/FWA components of each premises.

FIGS. 3A and 3B are block diagrams illustrating an exemplary embodiment of a fixed wireless configuration with relaying functionality utilizing CBRS frequency bands according to the present disclosure. As shown, the configuration 300 includes one or more xNB's 301a, 301b (e.g., 3GPP eNBs or gNBs), several "in-coverage" premises or houses 302a, 302b, and one "out-of-coverage" (OOC) house 302c. The houses 302a-c are each equipped with respective CPE/FWA apparatus 303a-c, each of the latter including CPE devices 311, Wi-Fi or other routers 323, PoE apparatus 325 (such as in the architecture of FIG. 2B discussed above), one or more antenna elements 321, and performance monitoring (e.g., "iPerf" or other performance assessment logic or software) agents 317. Each CPE/FWA 303a-c also includes D2D and packet networking functions as described subsequently herein (not shown in FIGS. 3A-3B for simplicity).

As discussed in greater detail below, in the exemplary embodiment, the iPerf agent at each house measures (depending on its connection status) key performance indicators (KPIs) such as data throughput (TP), latency and jitter, which are useful in assessing the needs and capabilities of each individual premises. In-coverage, over-performing or high-throughput CPE/FWA (such as that 303a, 303b respectively associated with Houses 302a, 302b in the illustration of FIGS. 3A-3B, by virtue of their location within range of the respective their respective serving cells 309a, 309b—and also being within a proximity or prescribed range of out-of-coverage CPE/FWA (such as that 303c associated with House 302c)—are accordingly suitable candidates for relaying their data service to such CPE/FWA 303c.

It will be appreciated that the use of exemplary performance measurement (e.g., iPerf) processes at the various CPE/FWA devices advantageously allows for a very low-overhead and efficient mechanism by which to judge whether a given primary or serving CPE/FWA is (i) deficient or over-performing in terms of one or more criteria relating to e.g., its SLA, and/or (ii) can sustain provision of relay or supplementation services to one or more other (i.e., OOC) CPE/FWA. Specifically, using a performance-based mechanism such as iPerf in the exemplary embodiments obviates more sophisticated analyses of channel conditions such as link budgets/path loss estimates, channel parameter measurement such as RSSI or RSSQ, determination of PER or BER, etc. Rather, the net or actual performance of any given link and its associated channel conditions at any given time are readily determined and used as a basis of determining whether supplementation is required.

For instance, if served House 1 302a and House 2 302b each have an SLA (service level agreement) requirement of 25/3 Mbps (DL/UL), and each of House 1 302a and House 2 302b are above the foregoing requirement, having 45/6 Mbps (DL/UL) and 50/8 Mbps (DL/UL), respectively (as determined by their respective iPerf clients), while House 3 302c has no data throughput (or TP) since it is completely outside the footprint of the serving cells in this example (in a geographic sense), then House 1 302a and/or House 2 302b can provide data throughput to House 3 302c which is considered to be "out-of-coverage." Additionally, if after provision of such service form House 1, House 3 302c can only achieve say 75% of its SLA on the DL, and say 90% of its SLA on the UL, then its performance is deficient or sub-SLA, and House 2 302b can be used to supplement the deficient performance level of House 3 302c if in fact House 2 has capacity to spare.

It will be appreciated, however, that SLAs for OOC premises may also be established initially at levels known to be supportable by other (primary) CPE, such as based on installation testing, or iPerf analysis of the other CPE in "worst case" conditions. For instance, if it is known that a maximum theoretical SLA for the OOC CPE is (based on worst-case scenarios for all eligible primary CPE) is X Mbps in UL and Y Mbps in DL, then the SLA for that OOC CPE may purposely not be established above those values, thereby avoiding customer disappointment or frustration. If subsequently additional capacity becomes available, then the OOC device can be given "upgrades" on its SLA, whether explicitly by contract, or implicitly via added capacity when available even with no formal commitment by the MSO to do so.

FIG. 3B illustrates the fixed wireless configuration with relaying functionality utilizing CBRS frequency bands of the type utilized in FIG. 3A, further showing the constituent components of each CPE/FWA 303 according to one embodiment of the present disclosure. As shown (and subsequently described in greater detail herein), each CPE/FWA 303 includes a performance monitoring client which enables in effect stand-alone assessment of its own performance relative to its particular SLA (which may not be the same for each of the CPE/houses shown, depending on contractual agreements, physical limitation of the installation, etc.). As such, each CPE/FWA in this embodiment can both assess itself relative to its own SLA, and "advertise itself" (whether actively, such as via request or advertisement messaging) as either needing a certain amount of network resources from primary CPE/FWA local to it, or being able to provide a certain amount of network resources to out-of-coverage or secondary CPE/FWA devices.

As previously noted, one primary attribute of the disclosure relates to its ability to provide coverage and data rates to CPE/FWA that are completely outside the coverage area of a network. Specifically, to receive signal power at the "out-of-coverage" coverage CPE/FWA (and thereby establish and/or enhance its data rate), the CPE/FWA may receive the signal from multiple in-coverage or relaying CPE/FWA. It will be appreciated that depending on the type of antenna elements 321 used in each CPE/FWA (e.g., directional or omni-directional), even a high-TP CPE/FWA 303a, 303b (FIG. 3A) may not be able to supply or supplement an out-of-coverage CPE/FWA 303c if the antenna geometry of the receiving devices does not support it, such as where highly directional antenna elements are utilized on one or both CPE/FWA and they are aligned to their serving xNB versus the other CPE/FWA.

Hence, in one implementation, the CPE/FWA may also have "smart" antenna capability that can steer the radiation pattern (e.g., lobes) toward the desired target CPE/FWA or serving base station 301 to maximize e.g., the received SINR. This steering may be accomplished via mechanical means (e.g., actually moving the antenna element or array in azimuth and/or elevation/tilt), and/or electronic steering means such as beamforming (e.g., as may be used in LTE) or so-called "massive MIMO" in 5G NR technology).

In one such implementation, a directional or steerable device such as the BLiNQ SC-300S dynamic device manufactured by BLiNQ Networks Corporation is used, which includes software-enabled targeting of specific areas to enable efficient coverage.

In another such implementation, each CPE/FWA employing multiple directional antenna element technology measures the received signal from its associated base station or another CPE/FWA in communication therewith (e.g., via D2D mechanisms such as ProSe described subsequently herein), and extracts multipath wireless channel information relating to phase and amplitude from the received signal. Such information is used to combine the output of the multiple antennas in such a way as to form a narrow sectorized beam towards the target base station or another CPE/FWA as appropriate, including as input to any mechanical steering mechanism (e.g., to change azimuth of the element/array). Various other similar approaches for optimizing SINR or other signal-strength related parameters will be recognized by those of ordinary skill when given the present disclosure.

Methodology—

Figure 4:
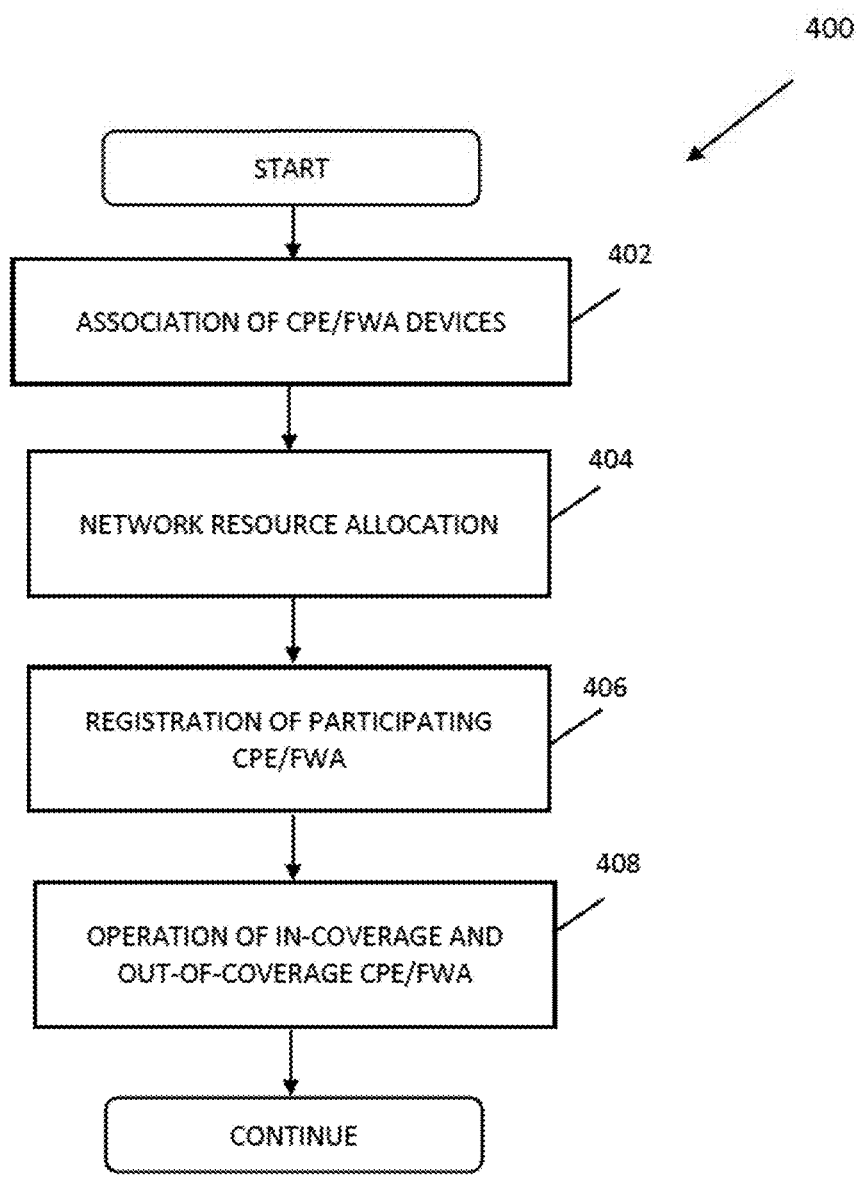
FIG. 4 is a logical flow diagram illustrating one embodiment of a generalized method for network operation in support of CPE/FWA out-of-network CPE/FWA according to the present disclosure.
Figure 5B:
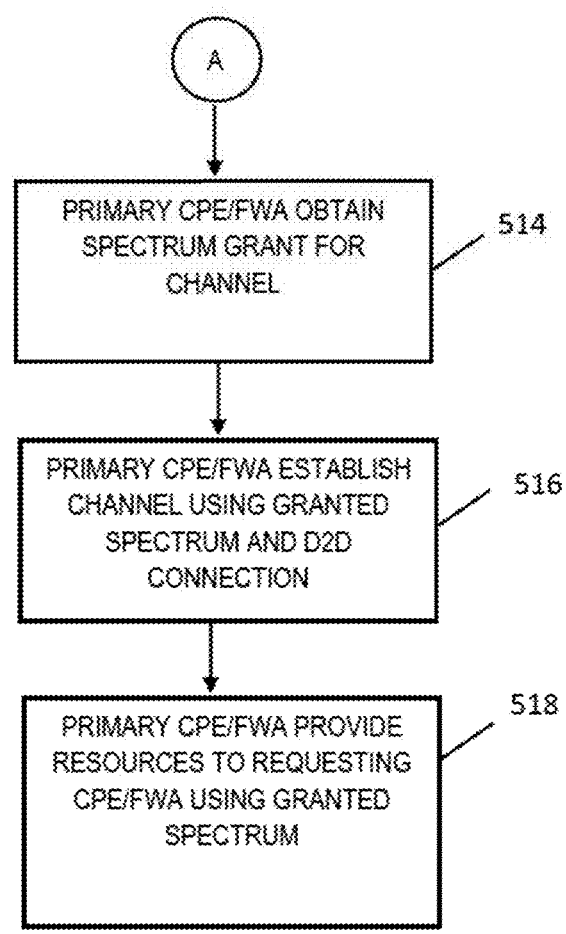

Various methods and embodiments thereof for providing throughput and coverage utilizing relaying via quasi-licensed (e.g., CBRS GAA or PAL) spectrum according to the present disclosure are now described with respect to FIGS. 4-5B.

FIG. 4 illustrates one embodiment of a generalized method for network operation in support of providing services to out-of-coverage CPE/FWA according to the disclosure. As shown, the method 400 includes first forming one or more associations between an out-of-coverage CPE/FWA 302c and one or more in-coverage CPE/FWA 302a, 302b per step 402. As discussed in greater detail below, such associations may be for example at the instigation of the out-of-coverage CPE/FWA 302c, or the in-coverage CPE/FWA, or even a network entity such as the EPC or 5GC or other.

Next, per step 404, the network allocates resources among the various participating CPE/FWA. In one such embodiment, the EPC or 5GC is tasked with generating resource allocations (including how much capacity or resources a primary or in-coverage CPE/FWA can provide to any associated out-of-coverage CPE/FWA which it will be prospectively serving.

Per step 406, after the resource allocation is complete, the participating CPE are registered with e.g., the SAS according to their respective roles (including for instance the primary CPE as a CBSD, and the secondary CPE as an FWA for utilization of e.g., GAA spectrum to communicate with the primary CPE/CBSD via one or more established communication channels).

Per step 408, the primary and secondary CPE are operated based on their registered roles and spectrum grants, utilizing the established channels.

Figure 4A:
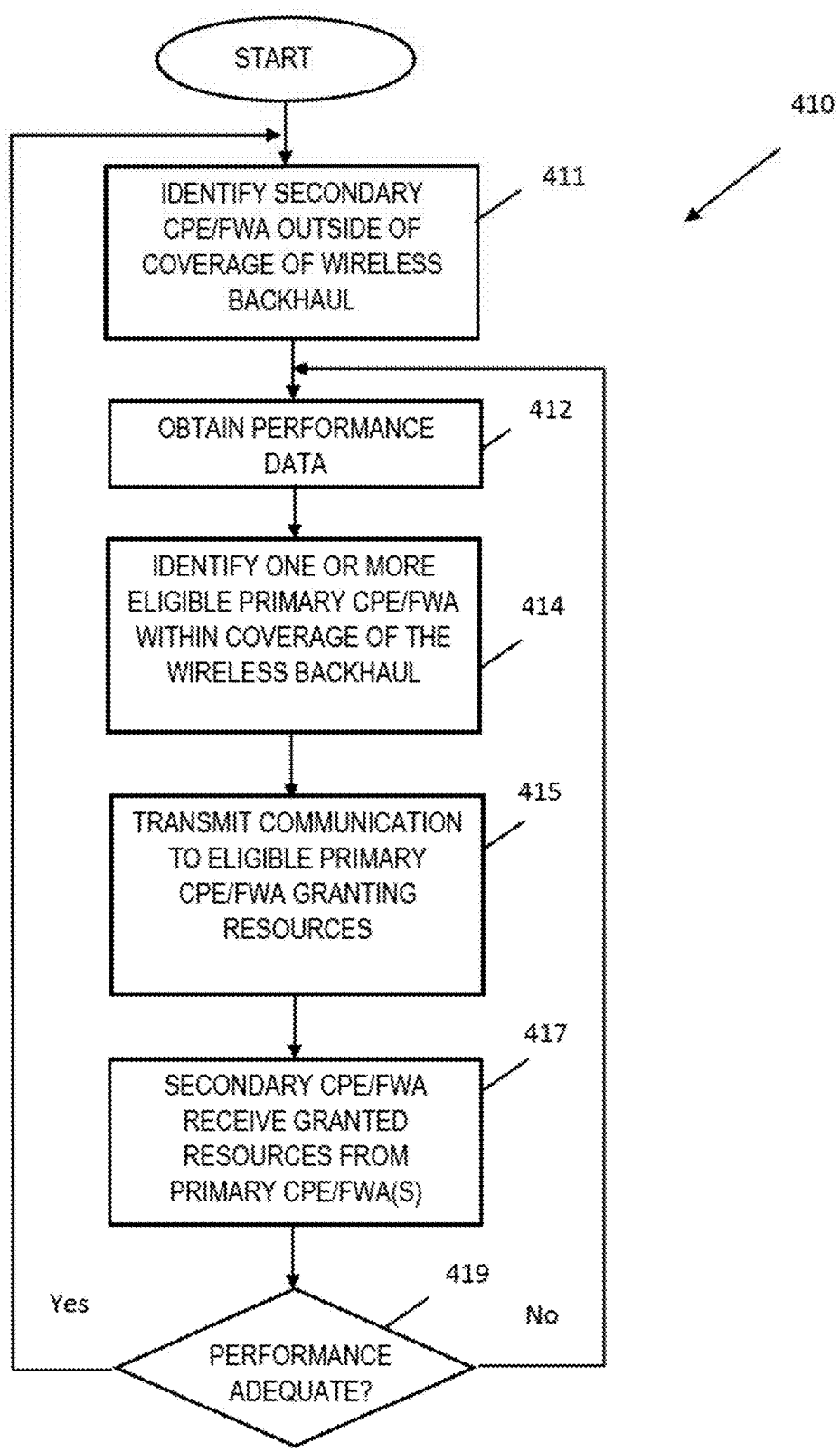
FIG. 4A is a logical flow diagram illustrating one embodiment of a method of "relaying" data from one or more in-coverage CPE/FWA (e.g., high-TP or high-throughput CPE/FWA) to a CPE/FWA that is/are completely out of coverage of a network, according to the present disclosure.

FIG. 4A shows one exemplary embodiment of the method used by a decision-making network entity (e.g., EPC or 5GC or other network entity) in providing network resources to an "out-of-coverage" or secondary CPE/FWA via one or more in-coverage or "primary" CPE FWA, according to the present disclosure.

As shown, the method 410 includes first identifying a secondary CPE/FWA that is not connected to any backhaul (e.g., has no connection to an xNB 301a, 302b) (step 411).

In one embodiment, the identification of the secondary or OOC CPE/FWA includes synchronization with, and discovery of, the secondary CPE/FWA via D2D mechanisms such as ProSe described subsequently herein. As described elsewhere herein, in one approach, a D2D communication channel is established between the various requesting/responding CPE/FWAs so as to facilitate establishment of the ultimate D2D "relay" channel (e.g., a channel via the primary air interfaces of the device using CBRS SAS-allocated bandwidth). Broadly speaking, a primary or secondary CPE/FWA according to the present disclosure may implement any number of protocols (the 3GPP D2D discovery protocols being just one example) to identify nearby or local CPE/FWA with which data connections may be established. As such, the present disclosure contemplates various embodiments wherein: (i) the out-of-coverage or secondary CPE initiates discovery of other CPE (via e.g., open announcement or request/response protocols described subsequently herein, or other types of "probe" communications); (ii) the primary CPE advertises itself via prescribed methods (D2D announcements, beacons, or other methods), and (iii) where the discovery of the primary and secondary CPE of each other, either bilaterally or unilaterally, is managed or invoked by a network entity, such as where a primary CPE is instigated by the xNB with which it connected to announce itself to local secondary CPE.

It will also be appreciated that in certain configurations, the secondary CPE may be a new installation (i.e., it has never previously formed any association or connection with any xNB or other CPE/FWA), and hence is in effect completely ignorant to its surroundings. In such cases, the newly installed CPE/FWA can be configured to invoke a "learning" algorithm (such as via 3GPP D2D protocols described in greater detail below) whereby it discovers and characterizes its surroundings before any D2D communication channel is established. This protocol may also include relay by one or more of the primary CPE which it discovers of data regarding the new CPE to the xNB (and ultimately EPC/5GC) serving the primary CPE so that the network can become cognizant of the new CPE before it is subject to resource allocation, registration, and other procedures pursuant to providing it "out of coverage" broadband service.

Returning to FIG. 4A per step 412, performance data is obtained using the performance monitoring process (e.g., iPerf 317) operative to execute on each CPE/FWA 303. Initially, the secondary CPE/FWA will have no service, and therefore only the performance of one or more primary or in-coverage CPE/FWA are monitored to identify one or more candidate (e.g., geographically local) CPE/FWA 303a, 303b which can putatively provide some bandwidth to the secondary CPE/FWA 303c, per step 414.

For instance, the measured or actual data rate over a prescribed period of time (e.g., averaged over n minutes) for UL and/or DL is assessed, and compared to the relevant SLA(s). When the prescribed criterion is exceeded for particular CPE/FWA, those primary CPE/FWA can spare some of their bandwidth for the secondary CPE/FWA 303c.

Besides monitoring performance and identifying particular primary CPE/FWA to use as "relays" to the secondary CPE/FWA 303c, steps 412 and 414 may also include calculating how much bandwidth the primary CPE/FWA(s) can provide to the secondary CPE/FWA 303c while still the maintaining adequate performance of its backhaul and meeting or exceeding the requisite parameters indicated by the relevant SLA(s).

Additionally, once the secondary CPE/FWA 303c ultimately establishes data service and receives bandwidth from say one primary CPE/FWA 303a, steps 412 and 414 can include calculating how much bandwidth the secondary CPE/FWA 303c will need from another primary CPE/FWA 303b to meet one or more parameters, such as those required by the SLA of the secondary CPE. It is further contemplated that in cases where there simply is not enough bandwidth or capacity available to the secondary CPE to meet its SLA (due to e.g., only one available candidate primary CPE which does not have sufficient capacity to meet the secondary CPE SLA as well as its own), allocation algorithms may be used to "fairly" (or unfairly) allocate the division of available resources between the two CPE, or alternative mechanisms may be used to try to obtain additional capacity (such as e.g., requesting a switch to PAL spectrum from GAA, since PAL is presumptively less "crowded" and hence has less interference and ostensibly better channel characteristics which may be able to support higher data rates).

At step 415, the identified one or more primary CPE/FWA 303a, 303b receive a communication indicating a grant of spectrum/resources (which may include instructions for providing the granted spectrum/resources to the secondary CPE/FWA 303c). In various embodiments, the receipt of the communication by the identified one or more CPE/FWA 303a, 303b can be based on one or more requests initiated from the identified one or more CPE/FWA 303a, 303b, and/or from the secondary CPE/FWA 303c via the identified one or more CPE/FWA 303a, 303b.

For example, in one variant, the secondary CPE/FWA 303c transmits directly (or via proxy process) a communication to the identified one or more CPE/FWA 303a, 303b requesting resources, after discovery thereof. Based on the request received from the secondary CPE/FWA 303c, the one or more primary CPE/FWA 303a, 303b then transmit a request to the relevant entity or entities responsible for granting spectrum (e.g., to the cognizant SAS via the serving xNB and core and DP).

After any requests have been received and spectrum is granted, the primary CPE/FWA 303a, 303b provides the secondary CPE/FWA 303c with the granted resources (e.g., via the established D2D side channels) per step 417, and per step 419, the performance of the secondary CPE/FWA 303c is monitored to determine whether the necessary SLA goals or criterion are met, or whether supplementation is needed.

For example, although at this point the secondary CPE/FWA 303c has been granted at least some resources, the date rates from the identified primary CPE/FWA initially used to relay network resources may not be enough to meet the necessary SLA goals or criterion, as determined by e.g., the iPerf client 317 operative to execute on the secondary CPE. Accordingly, method 410 then reiterates the process again starting at steps 412 and 414 to identify other candidate primary CPE/FWA that can supplement the throughput of the secondary CPE/FWA 303c.

Figure 4C:
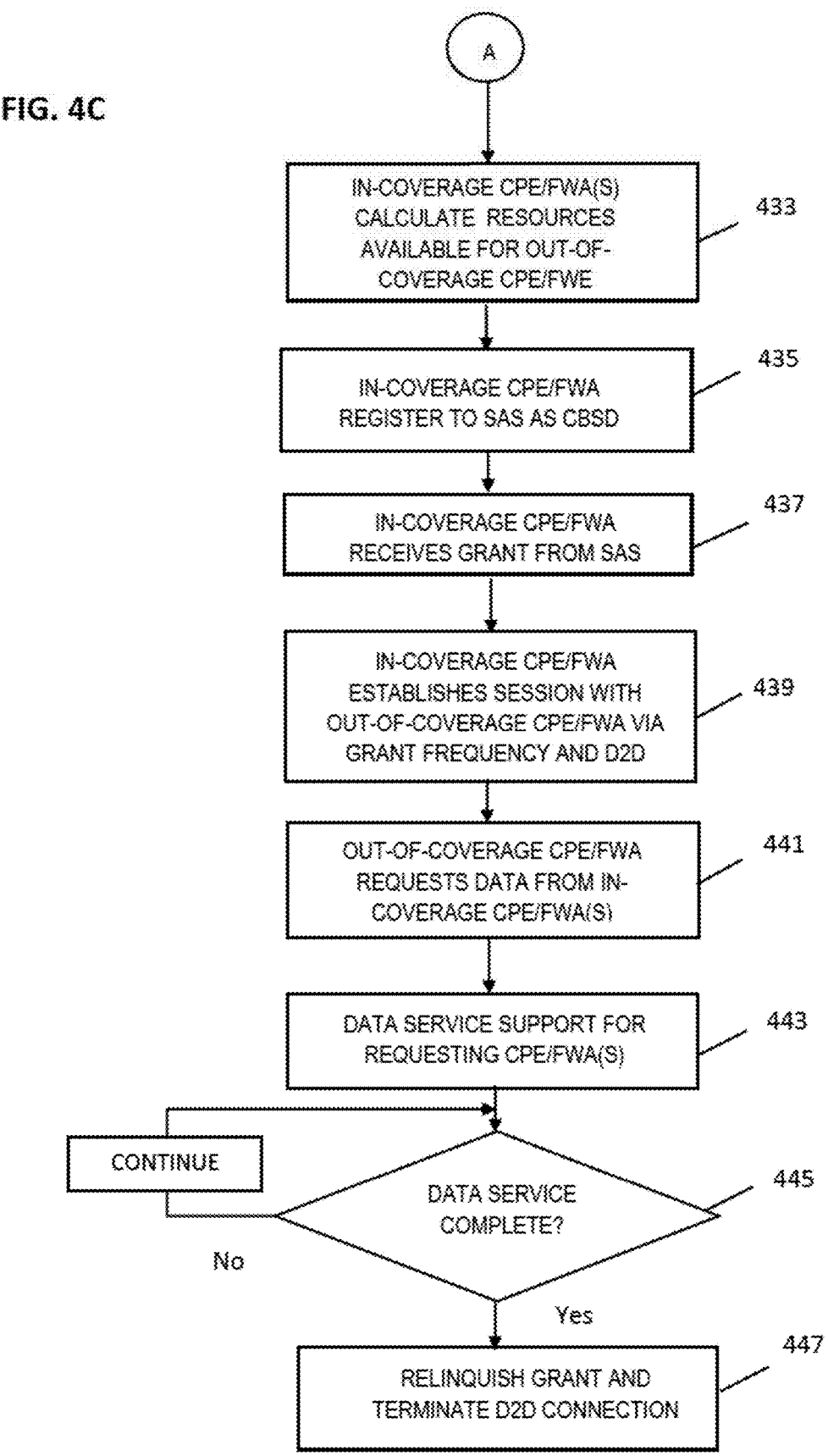

Referring now to FIGS. 4B and 4C, one embodiment of a methodology 420 of operating a wireless network is shown and described, in the exemplary context of a CBRS-based system with SAS, CBSD/xNBs and EPC/5GC, and in-coverage and out-of-coverage CPE/FWA devices.

Per step 421 of the method 420, each primary CPE/FWA utilizes its indigenous iPerf agent to measure KPIs (key performance indicators) such as data throughput (TP), latency, and jitter. The measurement by the CPE/FWA can be e.g., constant or periodic (e.g., according to a prescribed schedule), or alternatively event-based, such as based on a signal sent from a decision-making entity (e.g., SAS, CBSD/xNBs or EPC/5GC).

Next, per step 423, measured data from step 421 is compared with respective SLAs of the CPE/FWA, and if their data rates are higher than the respective SLA (or other relative criterion as discussed elsewhere herein), those the CPE/FWA can act as relays or supplementation devices for other CPE, such as those out-of-network. In one embodiment, the comparison may be conducted at the primary CPE/FWA. The results (e.g., how much the bandwidth the CPE/FWA can spare) can then be sent upstream in the form of a request to a network resource-granting entity (e.g., EPC or 5GC). In another embodiment, the comparison may be conducted at the decision-making entity. In this embodiment, the CPE/FWA would send the raw or pre-processed measured data to the relevant decision-making entity for processing thereat. In some embodiments, some network entity may maintain a database or data structure (e.g., such as the exemplary data structure of FIG. 5C discussed infra) for decision-making and tracking of network resource allocations.

Next per step 425, any out-of-coverage CPE/FWAs are identified/discovered. Since out-of-coverage CPE/FWA 303c is out of network and unable to synchronize itself to any serving xNB, it must do so through the in-coverage CPE/FWA 303a, 303b. For instance, in one approach, the out-of-coverage CPE/FWA 303c cannot advertise itself to the "network" since it is out of the coverage area thereof, so it must directly contact other CPE/FWA 303a, 303b within the network, via D2D side channel or other mechanism. The out-of-coverage CPE/FWA 303c can advertise itself to the CPE/FWA 303a, 303b using established protocols such as those relating to 3GPP D2D discovery.

Next, per step 427, the out-of-coverage CPE 303c (or their proxy process) identify one or more eligible in-coverage CPE (e.g., CPE/FWA which are within range and which are available to engage in D2D discovery and communication protocols as described in detail subsequently herein), and establish a D2D connection to the in-coverage CPEs at step 429 so as to support communications pursuant to authentication, IP address discovery, spectrum requests, determination of throughput capability of the serving CPE/FWA 303a, 303b, spectrum grant communication, etc.).

It will be appreciated that while the aforementioned process envisions the capability of the secondary CPE to establish D2D communications based purely on non-TP performance related criteria (i.e., which CPE are eligible for D2D per 3GPP protocols and which display suitable channel characteristics), the present disclosure contemplates configurations wherein the iPerf data measured by a primary CPE is passed to the secondary CPE as part of the D2D discovery or communication establishment procedure, in effect giving the secondary CPE a "preview" as to each prospective primary CPE's capability in terms of ultimate resource allocations. For example, in one such configuration, an announcing primary CPE includes payload data relating to available iPerf throughput which the secondary CPE can utilize to determine whether it wishes to establish full D2D communications with that CPE (e.g., to assist in ranking candidate primary CPE by the secondary CPE).

In another configuration, the secondary CPE obtains previews from various primary CPEs. In one such variant, the performance monitor (e.g., iPerf) process on each of the candidate primary CPEs measure and report performance to the network (e.g., EPC or 5GC). A decision process within the core network is then utilized to, based on the provided performance data, generate a connection plan, including directing one or more candidate primary CPEs to provide data service to the secondary CPE. The secondary CPE utilizes its own performance assessment after the aforementioned connection(s) is/are established to measure data throughput. These measurements are then reported back to the core network decision process, wherein the initial connection plan may be maintained or adjusted based on the actual performance experienced by the secondary CPE (e.g., relative to its required SLA levels). In this fashion, the core network process maintains cognizance over the various primary CPE (and served secondary CPE) in order to enable more efficient network configuration as a whole (e.g., to avoid overloading certain primary CPE, avoid creation of undue levels of interference between a given primary CPE and secondary CPE, and/or achieve other aims such as optimizing maximal throughput across a number of different CPE within a given area).

Next per step 431, resource requirements for the out-of-coverage CPE/FWA device(s) are determined for the relaying in-coverage CPE/FWA. In one embodiment, initially, use of the iPerf agent on the out-of-coverage CPE/FWA device may be obviated since the out-of-coverage CPE/FWA device has no service at all, and therefore will simply need the resources required by its SLA. However, once the out-of-coverage CPE/FWA device receives some resources from another CPE/FWA device, the iPerf agent on the out-of-coverage CPE/FWA device may be used to determine how much additional resources are required from other CPE/FWA to meet the target (e.g., SLA). Note that the iPerf of the secondary CPE may also send the raw iPerf data to another entity (including a primary CPE and/or the EPC/5GC) for such determination.

As a brief aside, the exemplary iPerf client used in the various embodiments described herein is a tool for network performance measurement and tuning that can produce standardized performance measurements. iPerf can be configured with client and server functionality, and can create its own data streams to measure the throughput between the two "ends" of the connection in one or both directions. The data streams can be for example Transmission Control Protocol (TCP) or User Datagram Protocol (UDP), and various parameters are user configurable (in the present context, by MSO design or testing personnel, or even dynamically via remote control from a network process). IPerf is typically embodied as open-source software written in C, and runs on various platforms including Linux and Windows. Notwithstanding, the present disclosure contemplates use of other performance monitoring techniques (whether implemented by the DUT (device under test) such as the CPE/FWA "self-assessing" itself, or from the other end of the connection, such as by a serving xNB 301 or primary CPE/FWA).

At step 433, the in-coverage CPE 303a, 303b calculate the amount of resources that can be allocated to the out-of-coverage CPE 303c (e.g., using their own iPerf client processes and respective SLAs). Note that in one embodiment, to avoid repeated request/grant/withdrawal cycles between two CPE/FWAs (i.e., "dither"), the iPerfs and monitoring algorithms can be configured to smooth (e.g., average) out the various parameters over time, and also anticipate changes in operating conditions or demand which may occur for the serving (or served) CPE/FWA, or implement a hysteresis function which mitigates such dither. For instance, if a given serving CPE/FWA 303a, 303b historically is largely inactive between 2:00 AM and 5:00 AM local time, it can be safely presumed in most cases that any excess capacity over and above SLA will be stable and not subject to sudden retraction or withdrawal by the serving CPE/FWA, such as might be caused by a user streaming multiple videos as might occur during normal (waking) hours.

Similarly, if a requesting CPE 303c has already received bandwidth from an in-coverage CPE, and therefore only transiently falls below one or more of its SLA criteria, the algorithms may be configured to ignore such transients, and only allow for supplementation requests that are more pervasive and continuous in nature. Likewise, if the requesting CPE/FWA 303c is configured to anticipate that, even though performance is deficient or below requisite levels, that no salient demand will be forthcoming for say several hours (e.g., during the same late-night window as referenced above), it may selectively forestall issuing requests or advertisements for resources, since the lack of performance is a logical "don't care" state, and the supplementation would not be used anyway even if provided.

Next per step 435, the in-coverage CPE 303a, 303b register to the SAS as CBSDs and request spectrum grants.

Per step 437, the in-coverage CPE 303a, 303b receive the grant from the SAS, and per step 439, a data session between the requesting or secondary CPE/FWA 303c and the serving or primary CPE/FWA 303a, 303b is established using the granted spectrum. In one embodiment, 3GPP side channel discovery and establishment procedures (including RACH, establishment of RRC Connected State, etc.) are performed.

Next per step 441, the requesting (secondary) CPE/FWA 303c requests data service from the in-coverage CPE 303a, 303b via normal 3GPP signaling, and data exchange between the various CPE/FWAs (served and serving) occurs to support service flows for the requesting CPE/FWA 303c per step 443.

Per step 445, the data service support starts between the CPE to provide the requested resources. The data exchange process between the serving (primary) and served (secondary) CPE is dynamic, and if the resources are not needed anymore, the SAS grant is relinquished by the serving CPE/FWA (e.g., via communication to the SAS) per step 447, and D2D connection between the primary and secondary CPE/FWAs is terminated.

FIGS. 5A and 5B illustrate an embodiment of a method of operation used by an in-coverage CPE/FWA in providing network resources according to the present disclosure.

As shown, the method 500 includes the serving or in-coverage CPE/FWA 303a, 303b receiving a request for resources from a requesting or out-of-coverage CPE/FWA 303c as described elsewhere herein (whether via LTE D2D synchronization, polling/pull, active request "push" by the out-of-coverage CPE/FWA, from an EPC/5GC, via a proxy process, or other) per step 502. Step 502 may also include detecting an announcement or advertisement message, beacon, probe, or the like from the out-of-coverage CPE/FWA 303c for initial synchronization and discovery.

Per step 504, the receiving CPE/FWA evaluates its own backhaul performance relative to its SLA. In one embodiment, the receiving CPE/FWA 303c is completely outside the coverage area of the backhaul and therefore would need the entire service level required by its SLA.

Per step 506, based on the evaluation of step 504, the CPE/FWA or a proxy (e.g., the 5GC or EPC) identifies an amount of resources which it can provide, and compares this amount to the requested or requisite amount associated with the request (step 508). In one approach, if the available capacity is adequate to support the request (step 510), then the primary CPE/FWA 303a, 303b notifies the requesting CPE/FWA 303c of the available resources (e.g., via D2D "side channel" messaging) per step 512.

At step 514, the serving CPE/FWA obtains a spectrum grant via registration of itself as a CBSD, and the secondary CPE/FWA as an FWA, with the SAS, and establishes the channel with the requesting CPE/FWA 303c as previously described (step 516). The relaying CPE then provides the amount of data services to the requesting CPE using the granted spectrum per step 518.

It is noted that the foregoing logic may be modified in a number of ways, depending on the particular application and desired functionality. For instance, in one variant, the secondary CPE is not apprised of any availability of spectrum or services from the primary CPE until the latter registers itself and the secondary CPE with the SAS, and obtains the spectrum grant.

In another variant, even when the entirety requested or required amount of capacity is not available from the primary CPE/FWA, the request is not refused, and the primary CPE allocates (e.g., at direction of the EPC or 5GC) what it has in terms of available capacity to the secondary CPE; that is, the decision to service the secondary CPE is not "binary" with respect to the requested capacity.

In yet other variants, the network is configured such that the EPC/5GC and primary CPE always allocates what excess the primary CPE has irrespective of any explicit data in a request (e.g., in cases where the secondary CPE does not provide or is incapable of providing an estimate of its required capacity), effectively akin to an "any service is better than none" paradigm.

It will also be appreciated that while a single served CPE/FWA 303c is described in the context of the foregoing discussion, a given serving CPE/FWA 303a, 303b may in fact service multiple requesting out-of-coverage CPE/FWA simultaneously. For example, a given primary or serving CPE/FWA may receive a request for resources from a first secondary CPE/FWA, and provide service to that device, and then subsequently receive a request from another "out-of-coverage" CPE/FWA, and assuming that its performance/capability are adequate, supplement that device as well. In one such approach, the two requesting CPE are served via two different spectrum grants (i.e., using two different carriers or bands, or even types of spectrum such as GAA for one CPE in one sector, and PAL for another CPE in another sector, the latter having a higher interference level in the GAA frequency band), and one or more allocated direction antenna elements and corresponding formed beams (the two requesting CPE presumed to be disparate enough in azimuth or elevation such that simultaneous supplementation is possible without unacceptable levels of interference).

In another approach, a time-share or TDM based scheme is used on the same carrier or set of sub-bands. Using OFDM-based 3GPP mechanisms, different time/frequency resource blocks are allocated to each served CPE/FWA as well. Each CPE may also be fitted with two or more separate transceiver chains (front ends) and associated baseband processing such that each served CPE may have its own dedicated air interface with a serving CPE/FWA if desired. Numerous other approaches to simultaneous provision of service to two or more requesting or secondary CPE/FWA will be recognized by those of ordinary skill when given the present disclosure.

Conversely, as previously noted, the present disclosure also contemplates provision of capacity or services by two or more primary CPE to a single recipient secondary CPE, such as e.g., where each of the two or more primary CPE are required to meet the SLA requirements of the secondary CPE/FWA.

Exemplary Data Structure Maintained for Decision-Making—

FIG. 5C shows an exemplary table maintained by a network entity (e.g., EPC or 5GC) for decision making (e.g., pursuant to the methodologies of FIGS. 4-5B), according to the present disclosure.

As described elsewhere herein, each primary CPE/FWA in one embodiment utilizes its indigenous iPerf agent to measure KPIs (key performance indicators) such as TP, latency, and jitter.

These measurements can be sent to the relevant decision-making entity (e.g., EPC or 5GC or other network controller) and maintained in a database or data structure (e.g., table) for decision-making.

In the exemplary table of FIG. 5c, the data includes: (i) identification of each primary and secondary CPE/FWA, (ii) the status (active, inactive) of each primary and secondary CPE/FWA, (iii) the respective SLAs or other parameters of each primary and secondary CPE/FWA, and (iv) the channel conditions and network KPIs for each connection between the primary and secondary CPE/FWAs. As will be appreciated, the data structure of FIG. 5C is a high-level representation of types of data which may be maintained by the network; in some implementations, such data may be part of IE's (information elements) such as those used pursuant to 3GPP protocols, with certain fields of the table of FIG. 5C gleaned from one or more extant IEs used during e.g., channel establishment, connection, etc. For instance, channel conditions for a D2D link may be monitored or gauged via existing 3GPP-based measurements taken for channel sounding, signal strength, BER/PER, etc. The data link performance measurements, while envisaged as being derived from iPerf client measurements on each CPE/FWA, may also be supplemented or obtained from other sources in alternate embodiments.

It is also understood that other data can be maintained concurrent or associated with that of FIG. 5C, such as that related to QoS or other policies or rules (e.g., those prescribed by the MSO for certain customers or tiers of service), germane topographical features or conditions, propagation or connection paths, other operating conditions such as network status, etc. This information helps in selectively establishing or terminating suitable D2D links for out-of-coverage CPE/FWA service provision.

Device to Device (D2D) Communication Mechanisms—

As previously referenced, certain embodiments of the apparatus and methods of the present disclosure establish communication between the various CPE/FWA devices 303 within a given network area using 3GPP-based Proximity Services (ProSe). This capability allows for, inter alia, the provision of data relating to a number of parameters to the CPEs to enable relay/service connectivity among themselves, assignment of unique IDs to each of the CPE, and establishment/teardown of communication channels between the various participating CPE/FWA. In some embodiments, these parameters include for instance: (i) security parameters (e.g., relating to mutual authentication, exchange of session or other keys, or other); (ii) group membership data and unicast/multicast addresses (e.g., IP addresses by which P-GW or other such entities within the network can address traffic), (iii) radio resource and related parameters; and (iv) service request/response messaging. It will be appreciated however that while the exemplary embodiments described herein are cast in terms of 3GPP ProSe and associated D2D mechanisms, the disclosure is in no way so limited, and in fact those of ordinary skill will recognize comparable implementations given the present disclosure.

As a brief aside, 3GPP TS 32.277 V14.0.0 (2016 September), "Technical Specification—3rd Generation Partnership Project; Technical Specification Group Services and System Aspects; Telecommunication management; Charging management; Proximity-based Services (ProSe) charging (Release 14)," which is incorporated herein by reference, describes the exemplary ProSe functionality utilized in some embodiments of the present disclosure. First introduced in Release 12 of the 3GPP specifications, ProSe (Proximity Services) is a D2D (Device-to-Device) technology that allows 3GPP-compliant devices to detect on other, and to communicate directly as opposed to via the core functions. It uses new functional elements including a "sidelink" air interface for direct connectivity between devices. In comparison to existing D2D and proximity networking technologies, ProSe offers some benefits such as enhanced scalability and management, privacy, security and mobile device battery-efficiency.

Figure 6A:
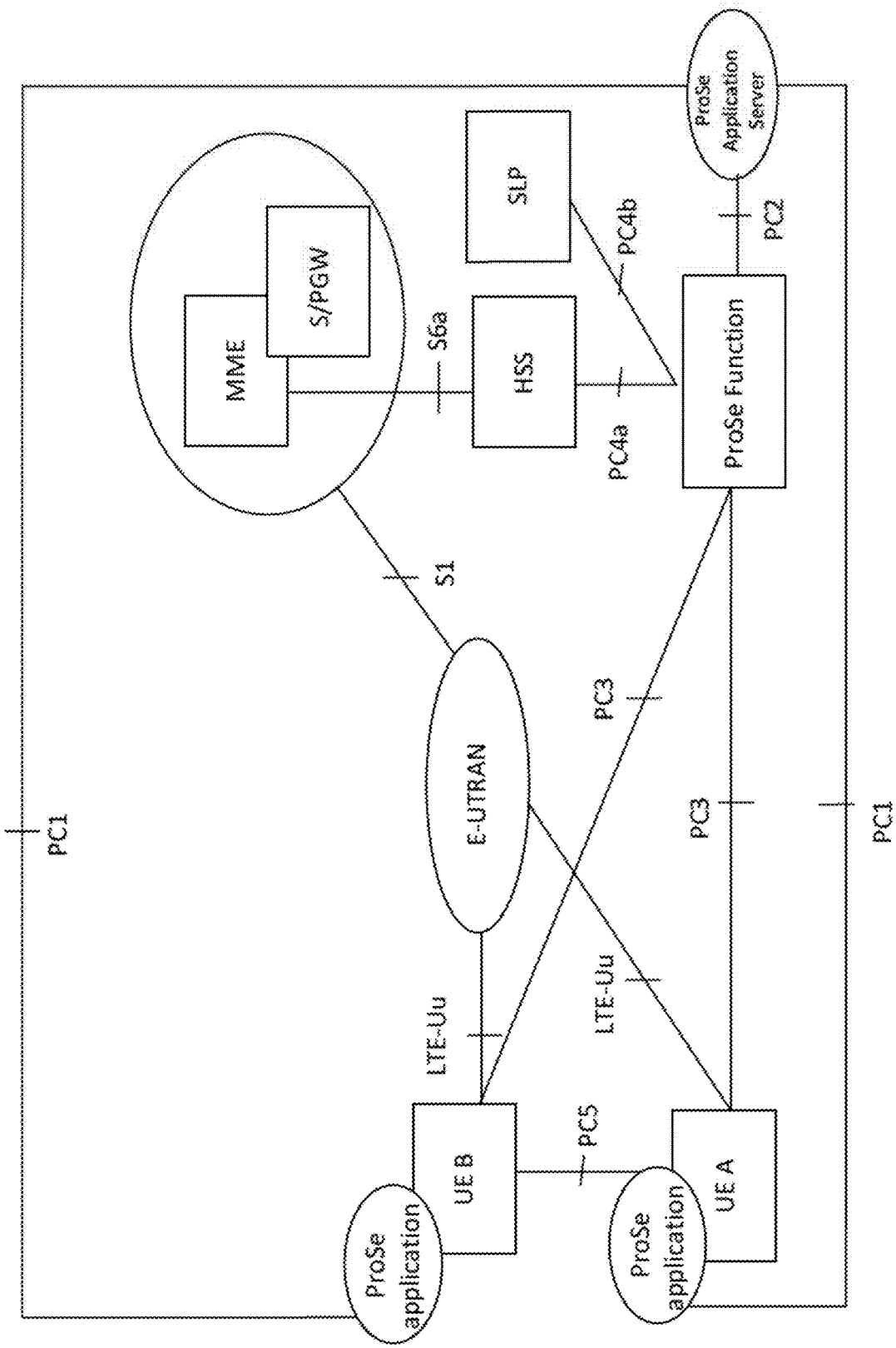
FIG. 6A is a block diagram of a prior art non-roaming reference architecture for proximity services (ProSe) according to 3GPP Release 14.

FIG. 6A illustrates one prior art non-roaming reference architecture for the above-described proximity services (ProSe) according to 3GPP Release 14.

Figure 6B:
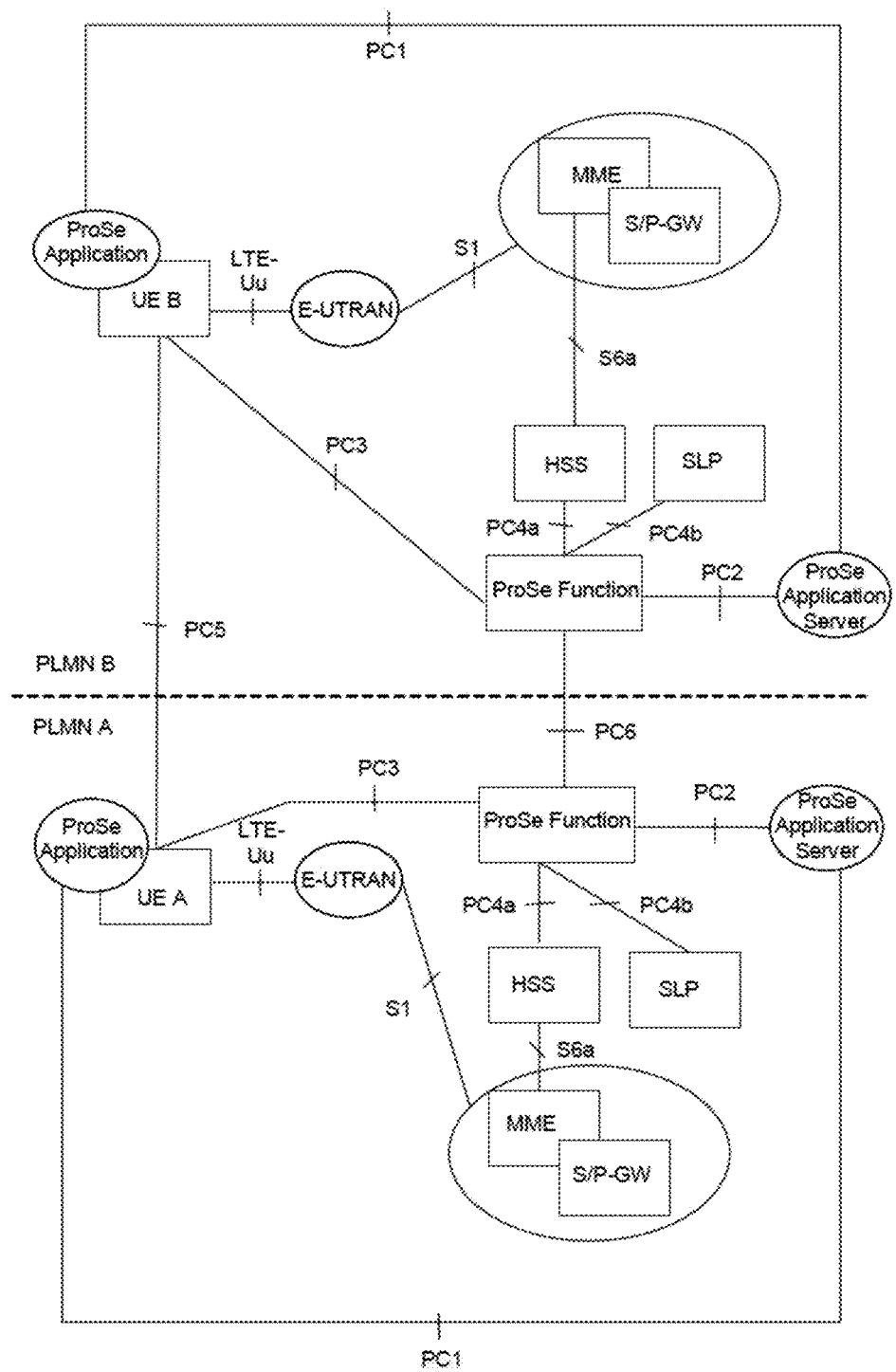
FIG. 6B is a block diagram of a prior art inter-PLMN reference architecture for proximity services (ProSe) according to 3GPP Release 14.

FIG. 6B is a block diagram of a prior art inter-PLMN reference architecture for proximity services (ProSe) according to 3GPP Release 14.

Figure 6C:
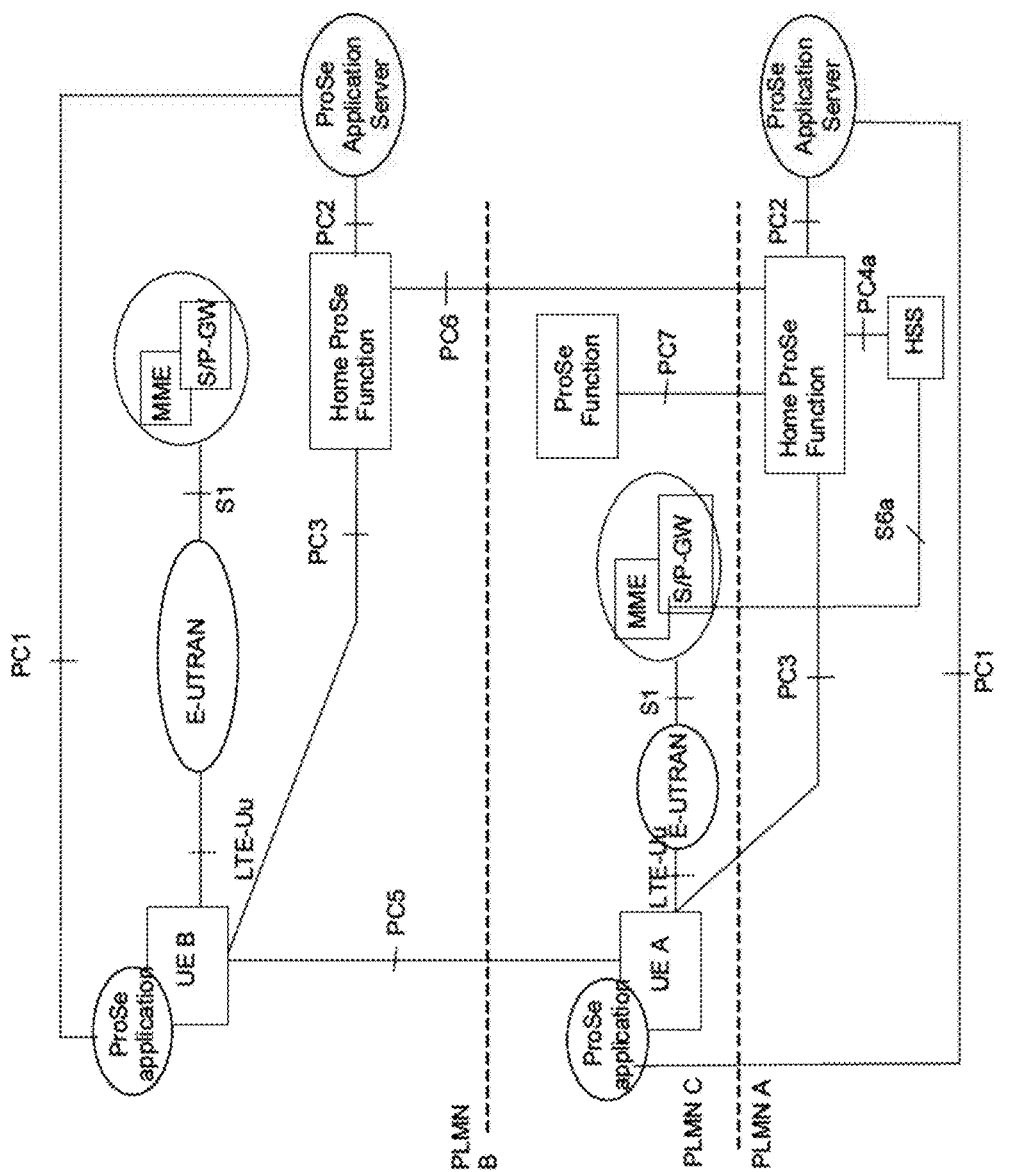
FIG. 6C is a block diagram of a prior art roaming reference architecture for proximity services (ProSe) according to 3GPP Release 14.

FIG. 6C is a block diagram of a prior art roaming reference architecture for proximity services (ProSe) according to 3GPP Release 14.

As can be seen in each of the above Release 14 architectures, a client-server model is used wherein a ProSe application on a UE communicates logically with a ProSe application server via e.g., a ProSe network function within the PLMN (public land mobile network) associated with the UE. A PC5 inter-UE communication interface is utilized for D2D communication (i.e., UE to UE) as shown, and Uu interfaces are used from the UEs back to the E-UTRAN.

3GPP D2D functionality was designed to operate regardless of the operational status of a given UE. Accordingly, three (3) scenarios were identified by 3GPP for D2D operation: (i) in-coverage, (ii) partial coverage, and (iii) out-of-coverage (which are not necessarily the same as CPE/FWA in-coverage or out-of-coverage designations or definitions as applied to the MSO architecture of FIGS. 3A and 3B as previously discussed). When the UE is in-coverage (3GPP definition), the D2D functions are network assisted; for example, the UE use the configuration and control information provided by the network via the eNB, as well as preconfigured parameters of the UE itself. When the UE is out-of-coverage, it utilizes the preconfigured parameters only, thereby enabling autonomous operations. Partial coverage (basically a hybrid of (i) and (iii) under 3GPP standards) allows UEs within network coverage to provide at least some system information to out-of-coverage UEs.

D2D communication over a 3GPP sidelink is performed using periodically repeating temporal periods. Two spaced channels are used; the Physical Sidelink Control Channel (PSCCH) and the Physical Sidelink Shared Channel (PSSCH). Each channel is provided a resource pool comprised of prescribed Resource Blocks (RBs) in the frequency domain, and subframes in the time domain.

The control channel (PSCCH) is used by ProSe-enabled UEs to send a sidelink control information (SCI) message. This message includes a variety of data, such as addressed recipient, transmission information such as the group destination ID, the modulation and coding scheme (MCS), and the PSSCH resource assignment in time and frequency, as well as other data. The SCI message allows the target UE(s) to tune to the corresponding resources in the PSSCH.

A given UE may be associated with one or more group IDs, and accesses the control channel time duration to determine if another UE is going to transmit something addressed to the group of which the monitoring UE is a member.

Two resource allocation (RA) modes are available in D2D communications (contrast: discovery); i.e., Mode 1 and Mode 2. In-coverage UEs can operate in either Mode; however, out-of-coverage UEs may operate only in Mode 2. In RA Mode 1, various functions are performed by or assisted by the eNB, such as resource scheduling. In Mode 2, a given UE manages aspects of its own resource scheduling autonomously, relying for example on preconfigured settings within the UE itself. For example, PSCCH and PSSCH resources can be selected at random from their respective resource pools by the UE autonomously in RA Mode 2. For Mode 1, the UE needs to be in the RRC_CONNECTED state, whereas for Mode 2, UEs in RRC_IDLE state (or even out-of-coverage) can utilize the protocol.

D2D discovery (contrast: communication as described above) is a functionality that allows the detection of services and applications offered by other UEs in physical proximity to a given UE. Discovery operates effectively independent from direct communication, and neither is required to precede the other. D2D discovery protocols allow UEs which have elected to be discovery-enabled to be directly identified by other discovery-enabled UEs. Two models of discovery are used: (i) Model A is based on an open announcement procedure, where a given UE broadcasts information to other prospective discovery-enabled UE(s); (ii) Model B uses a request/response protocol whereby a UE may request prescribed information from other UE(s). In addition to the discovery modes discussed above, two discovery resource allocation types are defined by 3GPP: Type 1 and Type 2B. In Type 1, (i.e., "UE-Selected"), a UE independently and arbitrarily selects the discovery resources for transmission of discovery messages. In Type 2B (i.e., "Scheduled") a UE-dedicated resource allocation is provided by the eNodeB for use by the UE.

For both resource allocation types, one salient objective is to mitigate the assignment of common time/frequency resources to different discovery transmissions. In the "Scheduled" type (Type 2B), conflicts are prevented, since the eNB is fully responsible for the allocation decisions. If the UEs are in-coverage, their "SyncRef" (synchronization reference) is provided by the eNodeB, and the synchronization configuration can be extracted from the SIB18 and SIB19 messages.

For the "UE-selected" resource allocation type (Type 1), UEs select autonomously the exact time and frequency resources from their available pool using a randomization pattern based on a MAC configuration parameter, from which the actual subframe and PRB indexes (within the pool) for carrying the discovery message are extracted. Different UEs ideally select different resources to avoid interference. At the receiver side, a UE can monitor for such transmissions using a number of different approaches, such as by monitoring resources corresponding to different configuration parameter settings which might have been utilized by the transmitting UE.

The 3GPP standards also define Sidelink synchronization information transmission procedures, including when a UE should act as a SyncRef, and distribute synchronization information. When in-coverage, the UE is designated as a SyncRef if the eNodeB explicitly instructs it to be, as well as when the eNodeB signal strength is below a prescribed threshold. An out-of-coverage UE assumes a SyncRef role if it is transmitting in the Sidelink and either (i) is not in possession of a selected SyncRef, or (ii) the signal strength of its selected SyncRef is below a prescribed threshold. When the UE assumes the role as a SyncRef, it periodically transmits Sidelink Synchronization Signals (SLSS) announcing its synchronization information. An SLSS is composed of four elements: (i) The Primary Sidelink Synchronization Signal (PSSS), (ii) the Secondary Sidelink Synchronization Signal (SSSS), (iii) the Demodulation Reference Signals (DMRS), and (iv) the Physical Sidelink Broadcast Channel (PSBCH). The PSSS and SSSS are used for time and frequency reference, collectively defining the SyncRef SLSS identifier (SLSSID). A subset of SLSSIDs is used for identifying SyncRefs in-coverage, and another subset used for out-of-coverage identification.

The PSBCH contains system level information used for configuration of a synchronizing (receiving) UE. The DMRS is used as a reference for CE (channel estimation), demodulation of the PSBCH, and measurement of Sidelink Reference Signal Received Power (S-RSRP) in the recipient UE.

The UEs search for available SyncRefs, measure the S-RSRP of the detected ones if any, and synchronize to the "best" one according to a Sidelink synchronization reference protocol.

Figure 7:
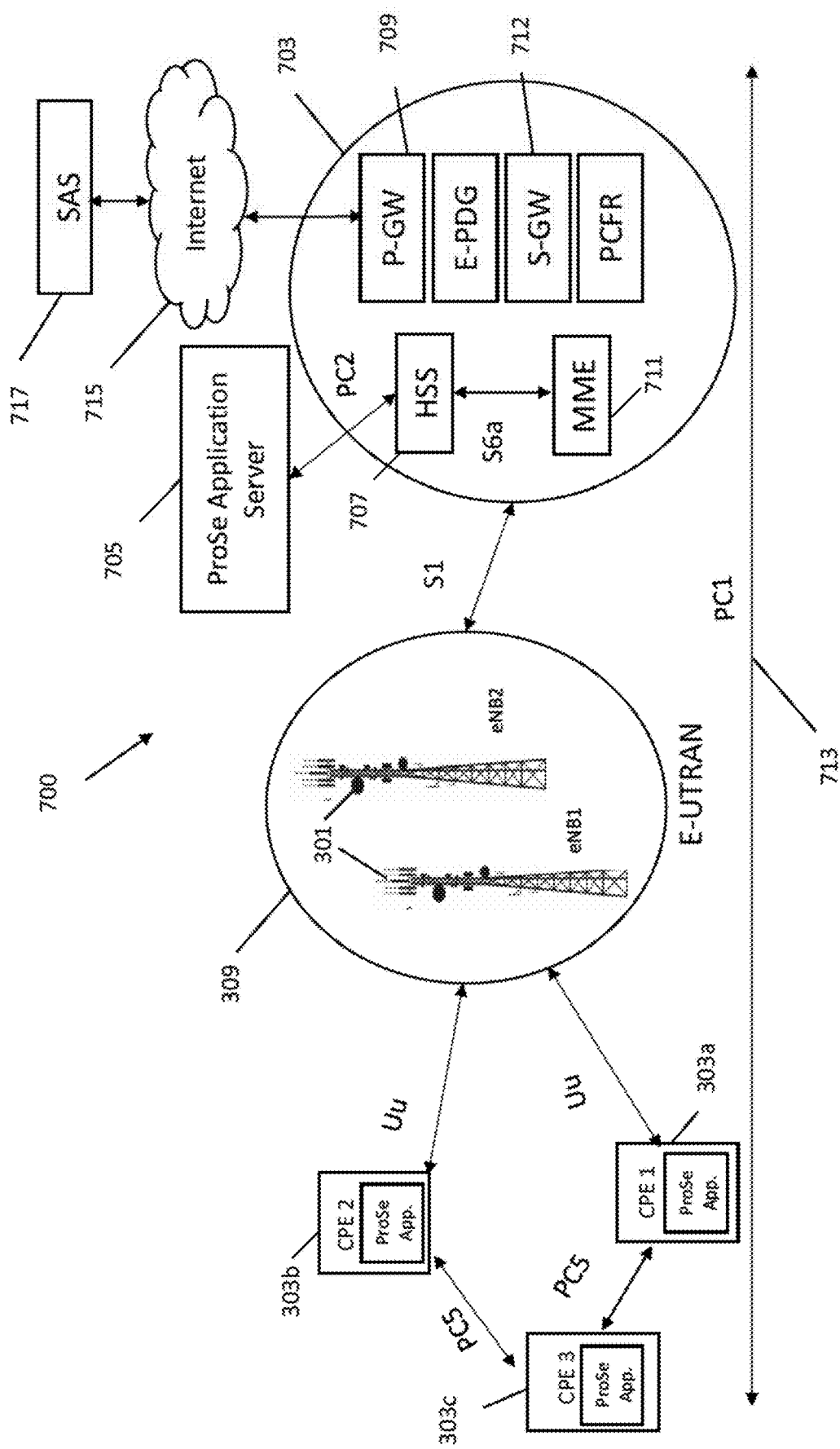
FIG. 7 is a block diagram of illustrating one embodiment of a quasi-licensed wireless network architecture, including ProSe (proximity services) capability, according to the present disclosure, wherein a 3GPP E-UTRAN-based configuration is used.

With the foregoing as a backdrop, embodiments of the present disclosure (see e.g., FIG. 7) leverage the ProSe architecture to enable, among other things, CPE/FWA-to-CPE/FWA communication in support of coverage of secondary CPE/FWA. In the architecture 700 of FIG. 7, the out-of-coverage CPE 303*c* (i.e., those which for instance do not meet MSO specified performance levels such as SLA requirements, as opposed to underlying technology definitions of "out of coverage" such as those described above with respect to the exemplary 3GPP protocols, the former which may be based in part on the latter, or wholly independent therefrom), receive/transmit from/to the E-UTRAN (including eNBs 301) over the Uu interface. Also, the serving (aka "primary" or high-TP) CPEs 303*a*, 303*b* receive/transmit data from/to the out-of-coverage CPE 303*c* over the PC5 interface. This data is aggregated in the exemplary embodiment at the transport layer as subsequently described herein with respect to FIGS. 10, 10A and 10B.

In the illustrated embodiment, the Evolved Packet Core (EPC) 703 or 5GC (depending on configuration) transfers the aggregated data packet from eNBs to e.g., the Internet 715. The EPC unit includes a Mobility Management Entity (MMS) 711, Packet Data Gateway (P-GW) 70, Evolved Packet Data Gateway (E-PDG), Serving Gateway (S-GW) 712, Policy and Charging Rules Function (PCFR), and Home Subscriber Server (HSS) 707. The ProSe application server 705 communicates directly with the EPC core 703 via the PC2 interface (or alternatively may be communicative with the EPC via the Internet 715) to provide support of the ProSe "apps" operative on each CPE/FWA within the architecture, including via the illustrated PC1 interface 713.

Figure 7A:
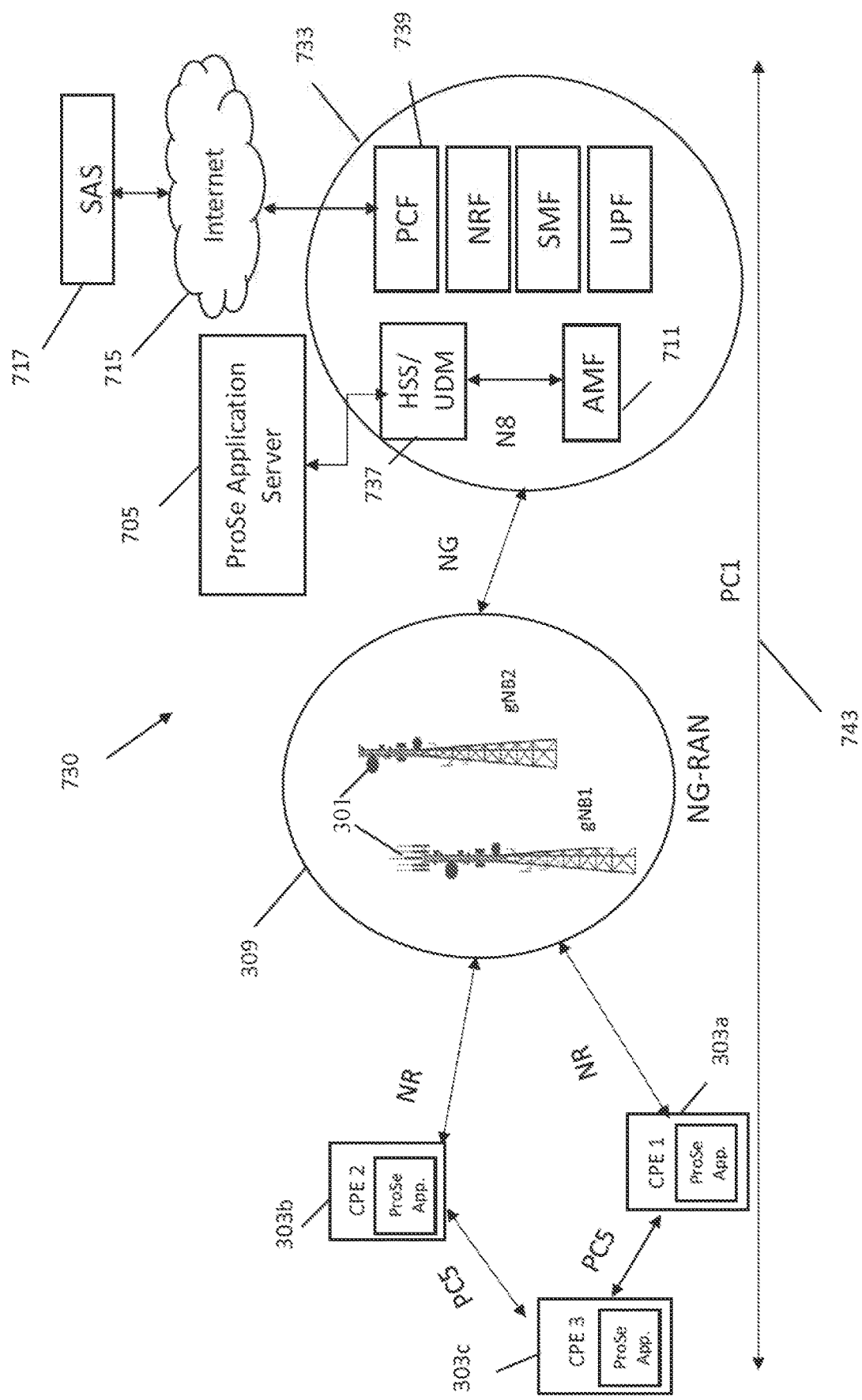
FIG. 7A is a block diagram of illustrating one embodiment of a quasi-licensed wireless network architecture, including ProSe (proximity services) capability, according to the present disclosure, wherein a 3GPP 5GC-based configuration is used.

FIG. 7A shows another embodiment of the ProSe architecture 730 of the present disclosure, wherein 5G NR network entities are utilized (including gNBs 301 and NG-RAN, 5GC 733, PCF 739, UDM/HSS 737, and AMF 711), as well as the ProSe app to Server interface 743.

As will be recognized, one major difference between the 5G Core (5GC) compared to the EPC is that 5GC's control plane (CP) functions interact in a Service-Based Architecture (SBA). The Network Repository Function (NRF) provides NF service registration and discovery, enabling NFs (network functions) to identify appropriate services within one another. These SBA principles apply to interfaces between CP functions within 5GC only, so for interfaces towards the Radio Access Network (NG-RAN), CPE/FWA or user plane (UP) functions (N1, N2, N3, N4, N6 and N9) are excluded. 5GC also has functional separation of the Access and Mobility Functions (AMF) and Session Management Functions (SMF), and also includes the separation of UP (user plane) and CP (control plane) functions of the gateway, which is an evolution of the gateway CP/UP separation (CUPS) introduced in 3GPP Release 14 for the EPC. Other differences include a separate Authentication Server (AUSF), and several new functions, such as the Network Slice Selection Function (NSSF) and the Network Exposure Function (NEF), each of which can be leveraged by e.g., a network operator such as an MSO/MNO when provisioning services to the various CPE/FWA, including in support of ProSe functions including those for relay or supplementation as described herein.

It will be appreciated that while the various embodiments of the present disclosure are described in the context of D2D communication provided via the 3GPP ProSe standards and framework, the present disclosure is in no way so limited, and in fact other D2D or "pseudo-D2D" communication modalities (including those which must pass through at least a portion of the MSO/MNO infrastructure supporting the CPE/FWAs) may be used consistent with the disclosure to provide the necessary cross-CPE/FWA identification and communication functionality.

Figure 8:
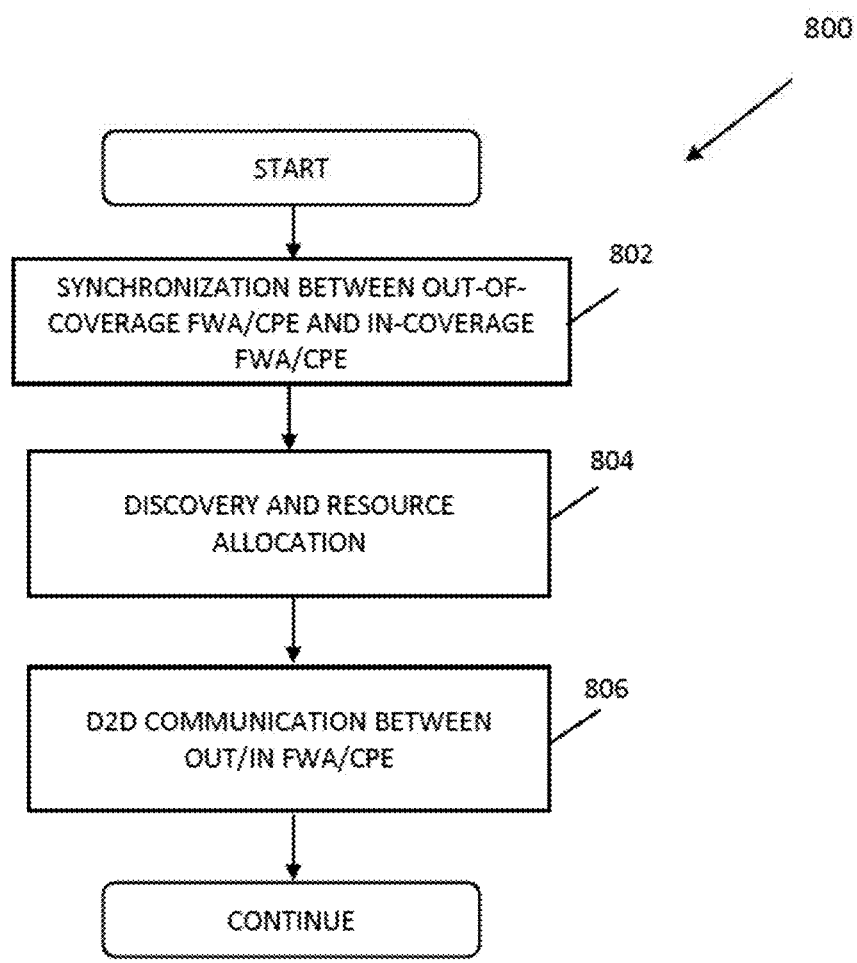
FIG. 8 is a logical flow diagram of an exemplary embodiment of a generalized method for signal flow for D2D connection establishment, according to the present disclosure.

FIG. 8 illustrates one exemplary embodiment of a generalized method 800 of using D2D discovery and synchronization protocols according to the present disclosure. As shown, in step 802, the out-of-coverage CPE/FWA 303c has to synchronize in time and frequency to the one or more in-coverage CPE/FWA 303a, 303b.

Next, per step 804, the discovery protocol is performed. In one embodiment, a discovery message or request is sent by an advertising (out-of-coverage) CPE to a other CPE in its local area. However, it will be appreciated that other approaches may be used consistent with the present disclosure, including instigation of discovery of out-of-coverage CPE/FWA by one or more in-coverage CPE/FWA (e.g., using announcement or similar protocols), including that directed by the network (e.g., EPC/5GC or another network entity such as an MSO network controller process).

Per step 806, D2D communication via the established channels is performed.

Figure 8A:
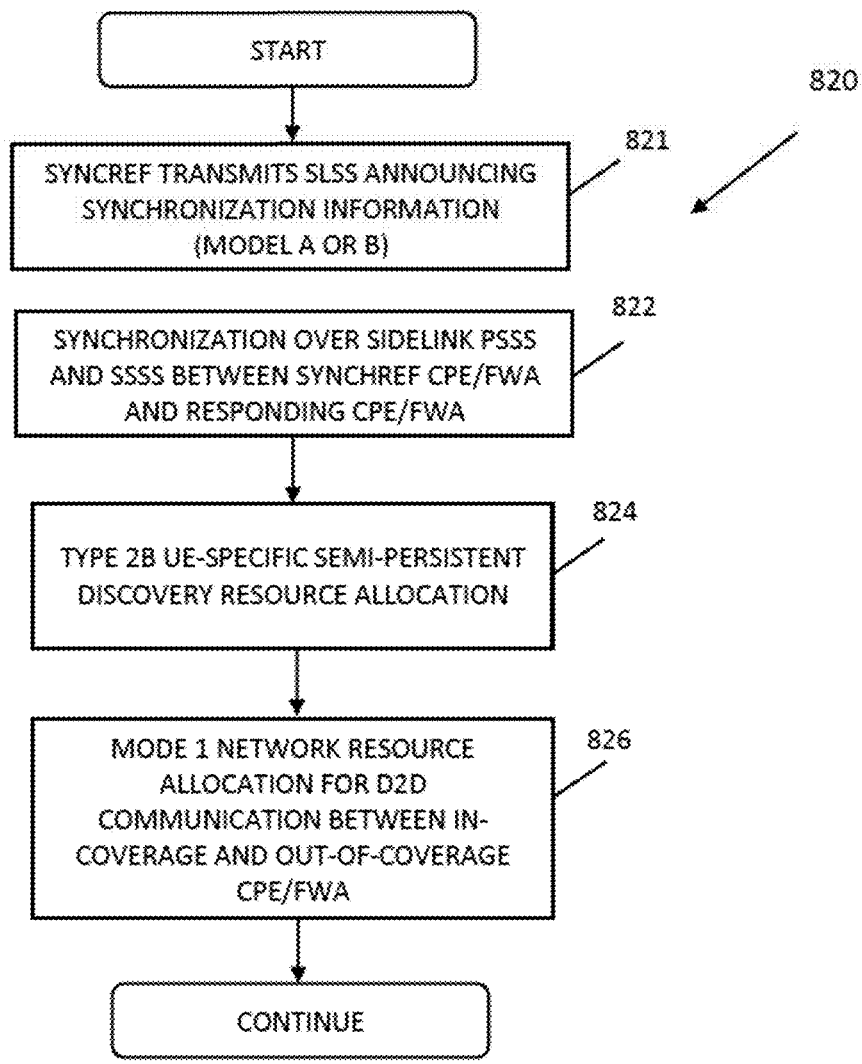
FIG. 8A is a logical flow diagram of an exemplary implementation of the method of FIG. 8, wherein 3GPP-based D2D protocols are utilized.

FIG. 8A illustrates one implementation of the method 800 of FIG. 8 in the context of 3GPP D2D procedures and protocols. Per step 821 of the method 820, the CPE/FWA acting as the SyncRef (which, depending on network configuration or conditions as previously described, may be either the secondary CPE/FWA or a primary CPE/FWA, and these roles may even be performed by both types of CPE/FWA to facilitate discovery between the devices). In the exemplary embodiment, the secondary CPE/FWAs are configured to operate as SyncRefs, and hence announce themselves via the SLSS. Note that Model A or B may be used (Model A being basically the "I am here" model, whereas Model B is the "who is there" type of approach). In some variants, the CPE/FWA may be programmed via e.g., firmware to assume one Model or the other on initial startup (e.g., Model A), but once responding primary CPE/FWA are discovered and the data relating thereto stored, the device will revert to the Model B approach since it is then aware (presumably) of specific primary CPE/FWA within range which will respond.

Similarly, the selection of Model AB may be predicated at least in part on desired latency parameters (e.g., Model B may, when a target primary CPE/FWA is known, produce faster synchronization and communication resource allocation, and hence less latency), and/or prior historical capacity or bandwidth capability (e.g., if a secondary CPE/FWA has data indicating that a given primary device is effectively always capable of meeting the secondary device's SLA, then the secondary device can target that primary device alone via Model B, whereas if the secondary device has historically had to contact multiple primary devices to reach its SLA, it may start out using Model A protocols to identify these multiple constituents rapidly). Numerous other permutations or combinations of Model A or B protocols may be used consistent with the present disclosure as well, the foregoing being merely exemplary.

Per step 822 of the method 820, D2D synchronization over a Sidelink is performed, using the previously described PSSS and SSSS. In one embodiment, the PSSS and SSSS are transmitted in two adjacent SCFDMA symbols in the same subframe. PSS is transmitted in a first slot of the subframe, whereas SSSS is transmitted in a second slot of the subframe. Sixty-two subcarriers are used to transmit PSSS, and sixty-two subcarriers are also used to transmit SSSS.

Next, per step 824, Type 2B UE-specific discovery resource allocation is utilized for the prospective D2D communication session establishment. As previously discussed, this Type is based on a schedule, and in one embodiment the EPC or 5GC "pushes" a schedule for CPE/FWA discovery allocation out to the primary CPE/FWA, which then communicates the UE (aka CPE/FWA)-specific schedule to the secondary UE during discovery, In another approach, the secondary CPE/FWA obtains the schedule for itself via its own firmware (i.e., is pre-programmed to select from a known pool of resources and schedule (which are also known or otherwise accessible to the network and hence the primary CPE/FWA)

Lastly, per step 826 of the method 820, radio resources for direct communication can be provided by the network (e.g., from EPC or 5GC via xNB) (Mode 1) or selected by the out-of-coverage CPE/FWA autonomously (Mode 2). In the exemplary embodiment, the one or more in-coverage CPE/FWA 303a, 303b, being in coverage and in RRC_connected state, can use transmission Mode 1, which means the network allocates the exact resource to the primary CPE. In transmission Mode 1, the one or more in-coverage CPE/FWA 303a, 303b sends a request requesting use of direct communication. Based on the requesting information, the xNB can send a grant of resources in an RRC message, which the receiving CPE/FWA 303a, 303b can then decode.

Figure 9:
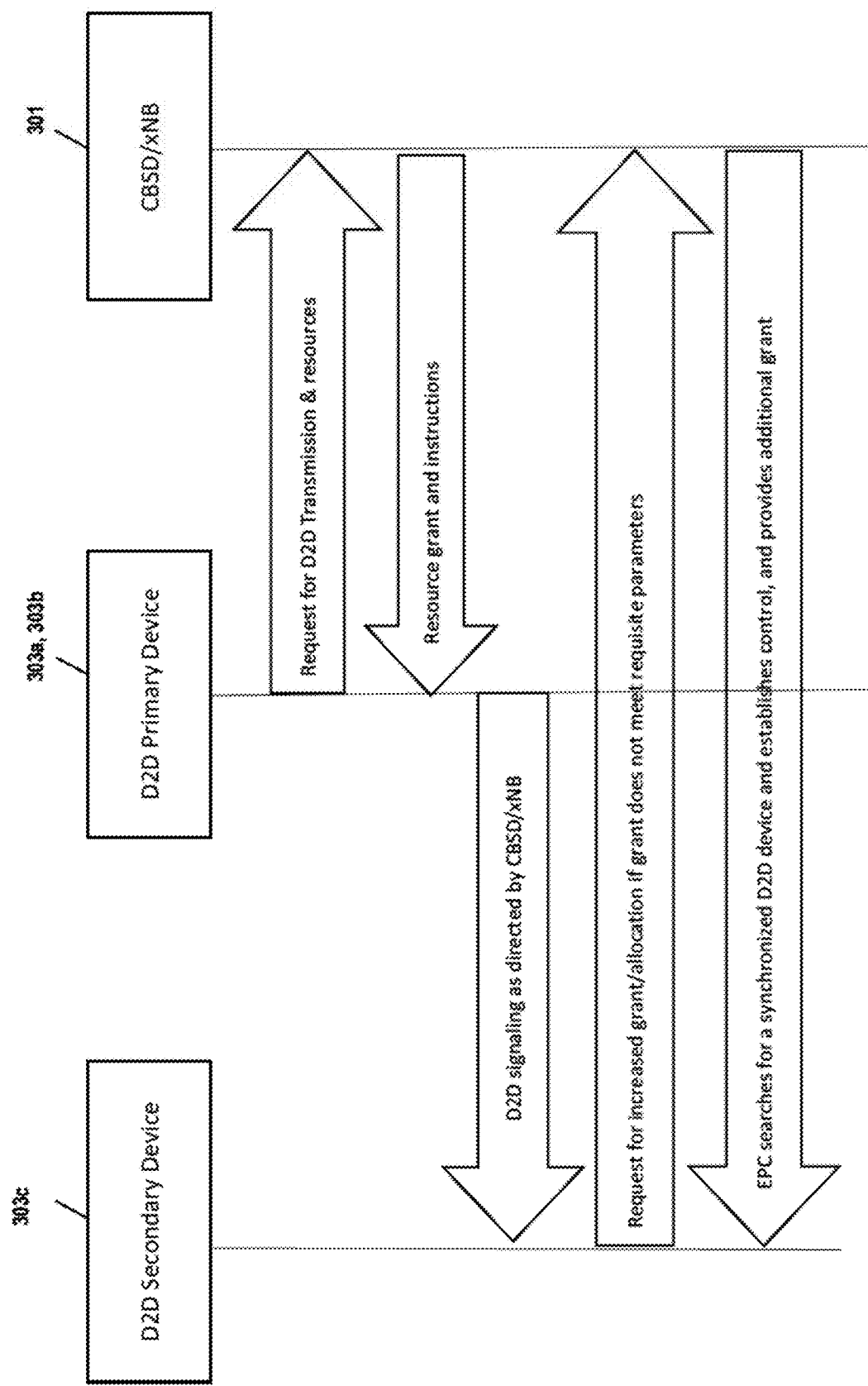
FIG. 9 is a ladder diagram illustrating the communication flow for resource allocation to D2D devices by CBSD/xNB (e.g., eNodeB), in accordance with the methods of FIGS. 4-5B of the present disclosure.

FIG. 9 is a ladder diagram illustrating an exemplary embodiment of a communications protocol used to implement the foregoing methodologies of D2D communication in support of out-of-coverage services according to the disclosure. In this embodiment, one or more primary CPE/FWA 303a, 303b first initiate a request to the network (here, the CBSD/xNB 301) for D2D communication resource allocation. Via the xNB/CBSD, the primary CPE/FWA(s) receive resource grant and related scheduling instructions from the serving xNB. Using the allocated communication resources, the primary CPE/FWA signals the secondary CPE (which has already been discovered via the D2D discovery and resource allocation protocols previously described). This signaling informs the secondary CPE/FWA of the network resources (including time-frequency resources) to be used for data communication with the serving primary CPE/FWA.

Subsequently, the secondary device 303c monitors its performance on the initially granted resources, and if deficient, makes request to the service xNB/CBSD (via the primary CPE) for additional resources. This request is evaluated by the network (e.g., EPC or 5GC entity), the latter which then searches for one or more other registered and synchronized primary CPE/FWA (i.e., already synchronized or at least synchronizable with the secondary CPE), and directs provision of additional resources to the secondary CPE via the identified one or more other primary CPE/FWA using a similar protocol to that used for the initial primary CPE/FWA.

Packet Management—

In that packet streams for a given recipient (e.g., out-of-coverage) CPE/FWA 303c must at some level be aggregated and carried across each of the serving bearers (other CPE/FWA 303a, 303b, and the base station 301), some mechanism is needed to manage such packet stream aggregation. In one exemplary approach, a transport layer function is used to manage packet allocations across the different bearers. This approach advantageously obviates any PHY or link-layer modifications, and also supports high-throughput so as to maintain QoS and SLA requirements for the target (out-of-coverage) CPE/FWA 303c.

Figure 10:
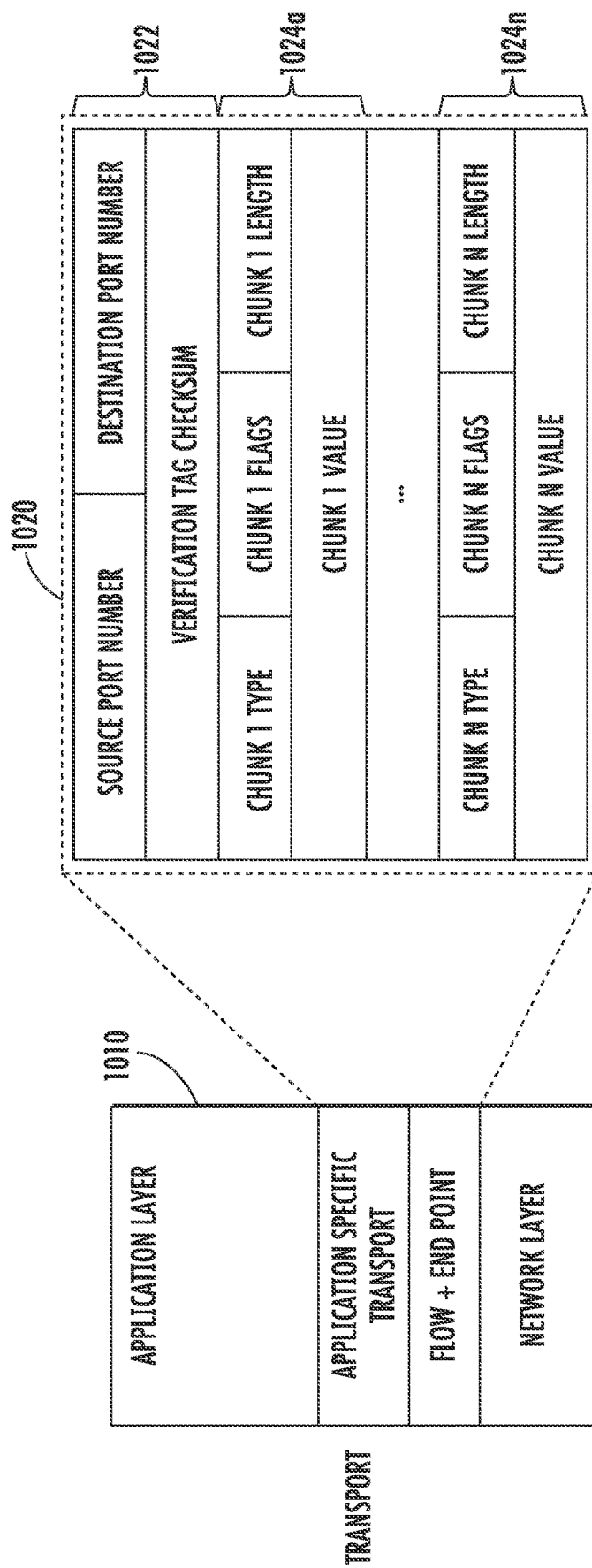
FIG. 10 is a graphical representation of aggregation of multiple SCTP links within an exemplary protocol stack of a secondary or out-of-coverage CPE/FWA, according to one embodiment of the present disclosure.

FIG. 10 illustrates an example of aggregation of multiple links at the transport layer of the out-of-coverage CPE/FWA 303c according to the present disclosure. As shown, the exemplary implementation of FIG. 10 uses a message-oriented protocol such as the Stream Control Transmission Protocol (SCTP) for packet bundling and transmission. A typical SCTP packet 1020 includes a common header 1022 and data chunks 1024a, 1024n from the respective in-coverage CPEs 303a, 303n, which are aggregated or associated in the transport layer of the recipient out-of-coverage CPE 303c. Each chunk 1024a, 1024n includes a one byte type identifier (with 15 chunk types defined by RFC 4960, incorporated herein by reference in its entirety, and at least 5 more defined by additional RFCs), flag bits, a chunk length field, and other data which uses the remainder of the chunk.

As a brief aside, Stream Control Transmission Protocol (SCTP) is a multi-stream transport layer protocol that supports multiple independent streams per logical connection. SCTP allows transmission of several independent streams of chunks in parallel to, inter alia, eliminate unnecessary head-of-line blocking and delays caused thereby, as opposed to Transmission Control Protocol (TCP) byte-stream or single-stream delivery which may delay transmitting data to wait for the possibility of more data being queued by the application. Additionally, SCTP utilizes multiple redundant paths to, inter alia, increase reliability. SCTP takes advantage of multi-homing, or multiple interface usage, at the transport layer, to allow a single SCTP association to run across multiple paths (e.g., in the present context, multiple PHY/layer 2 connections routed via different primary CPE/FWA).

Hence, in the illustrated embodiment of FIG. 10, the application layer process 1010 can utilize application-specific transports and endpoints and via SCTP (including e.g., each of the data connections between the in-coverage and out-of-coverage CPE/FWA 303a, 303b, . . . 303n, as well as the other serving CPE/FWA), support each of these via common transport layer functionality. Aggregation of these multiple links is applied using SCTP at the backhaul (baseband) of the out-of-coverage CPE/FWA 303c, in effect allowing the CPE/FWA 303c to act as a transport layer aggregator of (and congestion control process for) multiple streams of chunks 1024a, 1024n, including those intended for the out-of-coverage CPE 303c yet received via the different air interface channels.

In one embodiment, the streams from various primary CPE/FWA are combined using SCTP at the out-of-coverage CPE 303c. The reverse is carried out from the secondary CPE 303c towards the (primary) CPE/FWA and the serving base-station(s). Any duplication of packets is in one implementation taken care of by the underlying PDCP (packet data convergence protocol) of LTE (i.e., TS 25.323 and related).

Figure 10A:
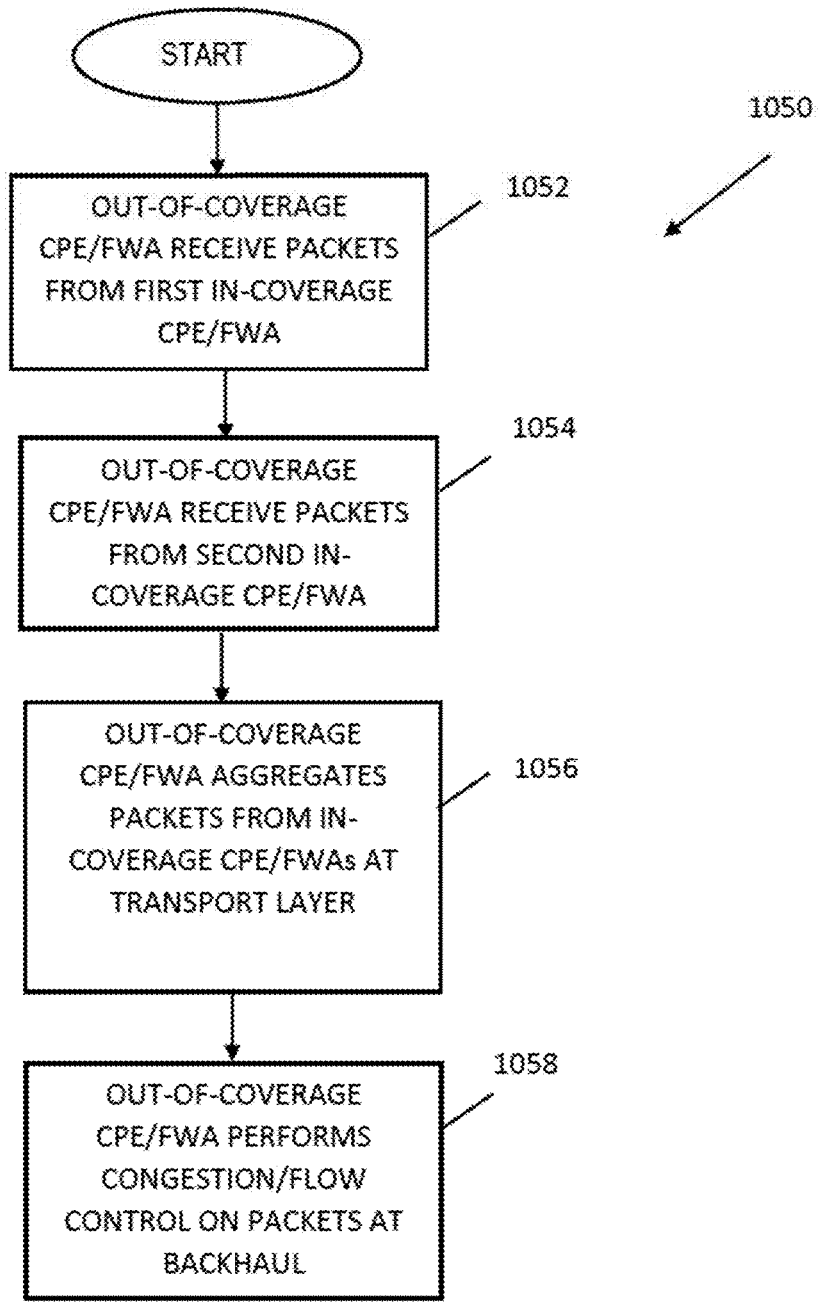
FIG. 10A is a logical flow diagram illustrating one embodiment of a method of aggregating multi-sourced packet data within a secondary or out-of-coverage CPE/FWA, according to the present disclosure.

FIG. 10A illustrates one exemplary generalized method 1050 of packet management over multiple bearers according to the present disclosure. As shown, in step 1052, the out-of-coverage CPE/FWA 303c receives packets associated with one of its streams or flows (e.g., associated with an application layer process 1010) from an in-coverage CPE/FWA 303a, 303b, via the air interface channels established with that device. Per step 1054, it also receives packets from another CPE/FWA 303a, 303b, via the air interface channels established with those devices.

At step 1056, the recipient out-of-coverage CPE/FWA aggregates the packets from all sources at its backhaul transport layer (e.g., using the SCTP protocol), and optionally applies congestion and flow control per step 1058 so as to optimize the backhaul as a "virtual unified" transport (e.g., via balancing of the individual constituents associated with the respective bearers of the serving primary CPE/FWA).

Figure 11:
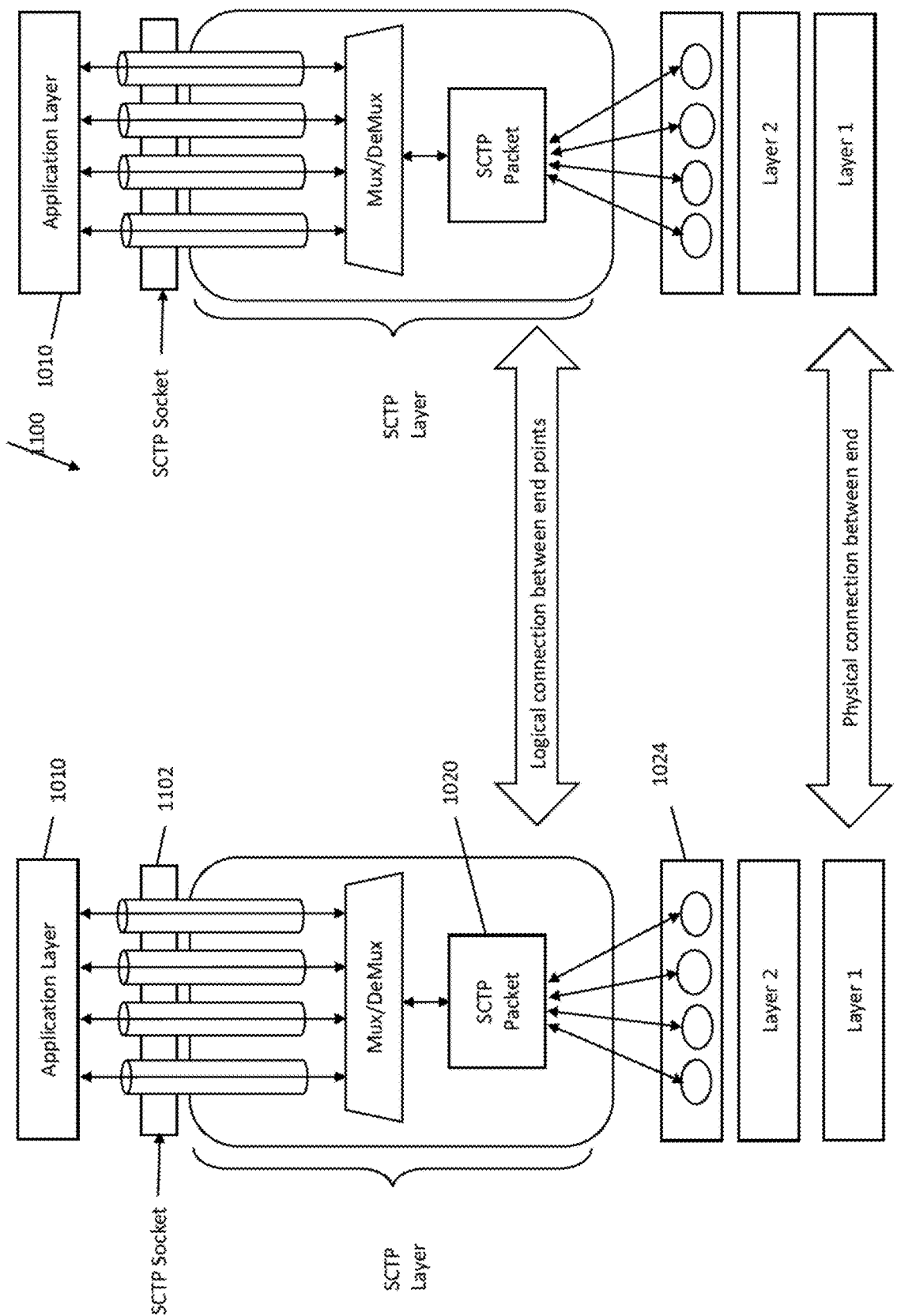
FIG. 11 is a functional block diagram illustrating the one embodiment of an exemplary SCTP-based architecture and associated packet flows, according to the present disclosure.

FIG. 11 is a functional block diagram illustrating the one embodiment of an exemplary SCTP endpoint architecture 1100 according to the present disclosure. In FIG. 111, data chunks 1024 associated with multiple links/connections (e.g., those received from multiple different primary CPE via their respective PHY connections to the recipient secondary CPE) are aggregated at the SCTP layer into a single SCTP packet 1020. Demultiplexing is also utilized to, inter alia, route packets associated with different destination ports to their proper application within the application layer.

Conversely, for transmission, different packets associated with different applications on the endpoint (e.g., secondary CPE/FWA) are sent to their target endpoints (e.g., an IP address of a distant process) by being routed via respective sockets 1102 to the mux process of the SCTP layer, whereby they are logically bundled or aggregated at the transport layer, and then transmitted to the network layer (IP) for transmission via the lower layers of the stack (which here, include multiple distinct "links").

In an alternate embodiment, the Transmission Control Protocol (TCP) packets from e.g., the respective primary CPEs 303a, 303b are aggregated in the recipient secondary CPE 303c based on use of Multi-path Transmission Control Protocol (MPTCP) 823. As a brief aside, MPTCP allows a Transmission Control Protocol (TCP) connection to use multiple paths to, inter alia, maximize resource usage and increase redundancy. These features enable inverse multiplexing of resources, and hence in theory increases TCP throughput to the aggregate of all available link-level channels (as opposed to a single one as required by non-MPTCP implementations based on standard TCP). Additionally, link-level channels may be added or dropped, such as where a given CPE/FWA begins or ceases service or supplementation of a secondary CPE/FWA in the present context, without disrupting the end-to-end TCP connection between e.g., the served CPE/FWA and a remote network server such as a content or web server. Link handover is handled by abstraction in the transport layer, without change to the network or link layers. Accordingly, link handover and instantiation/teardown can be implemented at the endpoints of the TCP session (e.g., the CPE/FWA) without requiring special functionality in the supporting sub-network infrastructure. Multipath TCP can balance a single TCP connection across multiple interfaces to achieve a desired throughput.

However, in certain use cases, scalability of MPTCP may be limited, such as by considerations relating to addressing; e.g., when there are more than two addresses for a given end point. This may be the case for instance for out-of-coverage CPEs, such as where more in-coverage CPE to out-of-coverage CPE connections are anticipated or used on average (as opposed to in-coverage CPE to in-coverage CPE connections).

Inter-Process Protocol—

Figure 12:
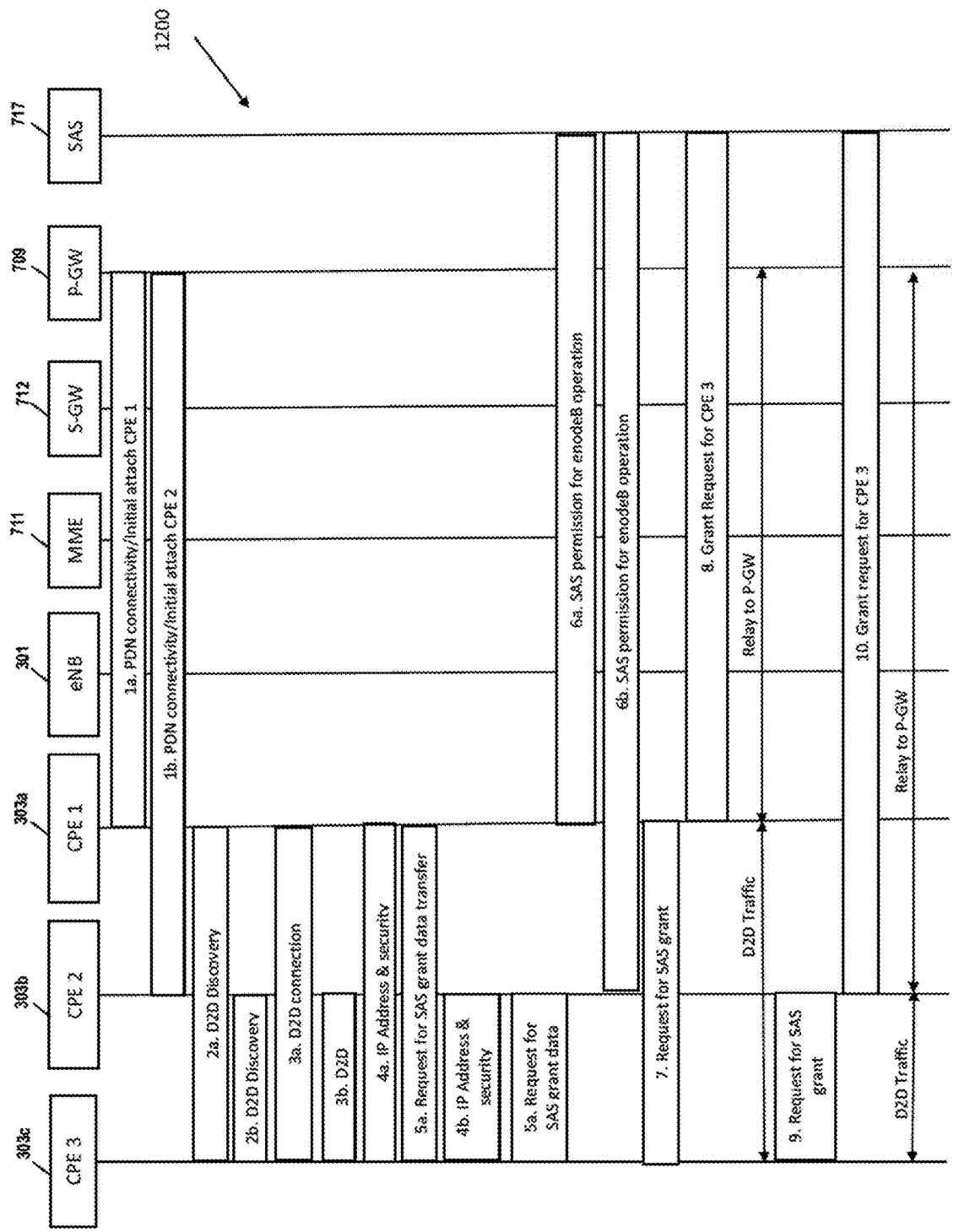
FIG. 12 is a ladder diagram illustrating the communication flow for "relaying" resources from one or more eligible CPE/FWA (e.g., high-TP or high-throughput CPE/FWA) within a quasi-licensed band wireless system wireless network to a CPE/FWA that is completely outside of the quasi-licensed band wireless system, in accordance with the methods of FIGS. 4-5B.

FIG. 12 is a ladder diagram illustrating the communication flow for providing quasi-licensed wireless service including IP data packets to/from an out-of-coverage CPE/FWA via one or more in-coverage CPE/FWA in accordance with the exemplary methods of FIGS. 4-5B.

In the embodiment illustrated in FIG. 12 (based on a 3GPP LTE infrastructure), the communication protocol 1200 includes the "in coverage" or serving CPE/FWAs 303a, 303b (see FIG. 3A) first performing initial attach procedures with the relevant E-UTRAN/EPC entities (including the P-GW packet gateway 709) via their respective serving eNBs 301 (steps 1a and 1b).

Next, D2D discovery of the type previously described between the out-of-coverage CPE/FWA 303c and the CPE/FWA of the other premises 303a, 303b is performed (such as via unlicensed or GAA spectrum), and after discovery and resource allocation, supporting functions such as IP address discovery and device authentication/negotiation are performed, as shown in FIG. 12 (steps 2a-5b). As previously noted, the various D2D processes may be "push" or "pull" from any node to any other, depending on how the protocol is configured (e.g., the out-of-coverage CPE/FWA may periodically instigate the discovery and request for resources, or alternatively one of the high-TP CPE/FWA devices may (after discovery and D2D connection establishment) periodically poll other CPE/FWA (including the out-of-coverage CPE/FWA) to cause the latter to evaluate their TP (e.g., versus their relevant SLA) and report back to the polling device.

It will be appreciated that the D2D discovery and connection process of steps 2a-5b may also take several different forms, depending on the particular functionality desired. For instance, in one approach, discovery and connection with all available prospective primary CPE/FWA is established irrespective of whether the out-of-coverage CPE/FWA 303c will utilize them; the various discovered and connected CPE/FWA will evaluate their own ability to relay (as previously described with respect to e.g., FIGS. 4A-5B), and either the requesting CPE/FWA 303c or the relaying (primary) CPE/FWA 303a, 303b will decide which of the connected population are ultimately utilized, such as based on directives from the EPC.

Alternatively, in another approach, more serialized logic is utilized, such as where the connection and evaluation of each prospective primary CPE/FWA is conducted before any further D2D connections to other CPE are established. For instance, if the first "connected" CPE/FWA is capable of providing complete resources to the out-of-coverage CPE/FWA (e.g., up to its SLA) as determined by e.g., the EPC, then no further communication is required with other potential primary CPE/FWA. This approach has the advantage of lower processing overhead and simultaneous radiated interference from the participating CPE (e.g., as opposed to a "broadcast" or other such model), yet may also introduce additional latency in reaching full SLA resources for the out-of-coverage CPE/FWA.

In yet another approach, the out-of-coverage CPE/FWA 303c may access historical or even predictive/speculative data regarding one or more known primary CPE/FWA (e.g., captured via prior sessions between the devices, or via a download of such data from one or more of the MSO or MNO core entities), and use this data to make an "educated guess" as to which primary CPE/FWA is likely to be the optimal choice for relaying (e.g., which CPE/FWA or grouping thereof has historically provided, or is projected to provide, complete resources with the minimum of overhead. For example, if one nearby CPE/FWA has historically always been able to provide complete SLA resources to the out-of-coverage CPE/FWA 303c by itself, then this is an obvious first choice. As such, the present disclosure contemplates that each CPE/FWA may build its own (or be provided with) a hierarchy or "logic tree" to be applied to the D2D logic of steps 2a-5b in FIG. 12.

Note that as previously indicated, the foregoing type of gating or selection can (i) be applied at the D2D discovery phase; i.e., a secondary CPE/FWA may selectively only initiate D2D discovery and resource allocation procedures with a subset of potential primary devices based on prior data or knowledge, or (ii) after discovery/communication establishment is complete, such that the secondary CPE can obtain actual (then current) TP/iPerf data on which to base its selection of a primary CPE. Moreover, in the EPC-based model, primary CPE/FWAs can provide their then-current TP/iPerf data to the EPC which can generate its own logic tree or hierarchy for any subsequent requests from secondary CPE for supplementation (e.g., based on a given "live" time window and associated geographic area). As such, the EPC can "pre-load" certain primary CPE to immediately respond as suitable candidates for any incipient secondary CPE requests received within the window, including also possibly allocating PAL or cleaner spectrum to such primary CPE). This approach may also be utilized in conjunction with the foregoing "targeted" secondary CPE discovery and connection procedures; e.g., such as where a pre-loaded primary CPE (which in effect always responds to the service requests of a given secondary CPE unless it is incapable of doing so) is also used by the secondary CPE as its first or priority ("go-to") CPE for D2D discovery.

It will also be appreciated that the foregoing decisions/logic may be handed off to another network entity or process, such as logic within the P-GW 709, or even another MNO or MSO entity or controller, including e.g., the ProSe server when so equipped.

Per steps 6a-6b of FIG. 12, the participating (primary) CPE/FWA 303a, 303b then contact the cognizant spectrum allocation process (e.g., the SAS 717 for CBRS implementations), such as via an MSO-based or third-party domain proxy (DP)—not shown, to request a spectrum grant to enable bandwidth relaying to the requesting out-of-coverage CPE/FWA 303c. Per CBRS protocol, the SAS registers the devices (itself as a CBSD, and the secondary CPE as a non-CBSD FWA) and returns the respective grant(s) to each requester 303a, 303b, thereby enabling establishment of wireless connection (e.g., RRC Connected state) via the primary air interface of each CPE/FWA (i.e., within the 3.550-3.70 GHz band using 3GPP LTE or NR protocols).

It is noted that the D2D discovery and connection protocols of steps 2a-5b are in one embodiment conducted using a "sidelink" (e.g., the Sidelink as specified in Rel. 12-14), or another alternate channel which may be available for such purposes. In one embodiment, the system (granted) frequency utilized by the in-coverage CPE/FWA is used for purposes of the D2D/sidelink communications, although it will be appreciated that other frequencies or bands may be used consistent with the present disclosure. The sidelink frequency can also be indicated in the grant. In FIG. 12, the primary CPE/FWAs are requesting permission from the SAS for "xNB-like operation" to support the out-of-coverage CPE.

CBRS FWA Apparatus—

Figure 13:
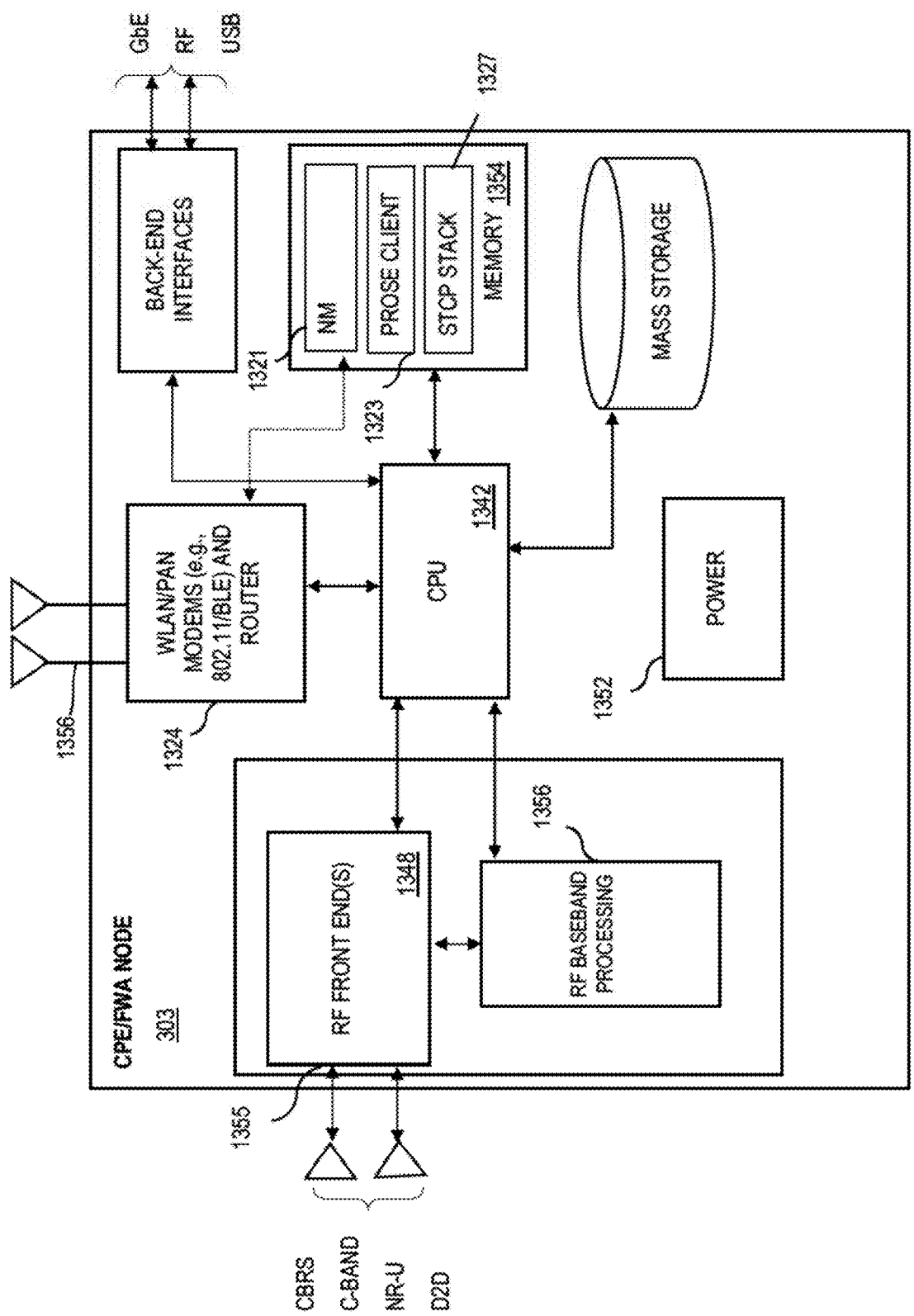
FIG. 13 is a functional block diagram illustrating one embodiment of an exemplary CPE/FWA apparatus configured for provision of services via the out-of-coverage techniques of the present disclosure.

FIG. 13 illustrates one exemplary embodiment of a CPE/FWA 303 (e.g., roof-mounted FWA with associated radio head and CPE electronics) configured according to the present disclosure.

It will be recognized that while described generically, the apparatus of FIG. 13 is readily adapted for use as either a primary or a secondary CPE, and in fact, the present disclosure contemplates configurations where each CPE/FWA in a given network or network portion are configured to be able to operate as both a primary and secondary CPE/FWA depending on application or operational context. For instance, a given secondary CPE 303c may, upon availability of a new xNB installed or turned on nearby, may then become "in network" and act as a primary CPE/FWA 303a. Rather than maintain two heterogeneous hardware/software/firmware configurations and logistics/supply chains therefore, it may be most effective to simply provide all customers/installations with a "stem cell" CPE/FWA which can readily assume either role depending on its particular circumstance.

It will also be appreciated that while described in the context of a CBRS-compliant FWA, the device of FIG. 13 may be readily adapted to other spectra and/or technologies such as e.g., Multefire, DSA, LSA, or TVWS.

As shown in FIG. 13, the CPE/FWA is a Node Manager (NM)- and ProSe-enabled device which includes, inter alia, a processor subsystem with CPU 1342, a memory module 1354, one or more radio frequency (RF) network interface front ends 1348 (e.g., adapted for operation in the 3.55-3.70 GHz band, C-Band, NR-U bands, etc.) and associated antenna elements 1355, one or more backend interfaces (e.g., USB, GbE, etc.), a WLAN/BLE module 1324 with integrated WLAN router and antennae 1356, power module 1352 (which may include the aforementioned PoE injector device), and an RF baseband processing module 1356.

In one exemplary embodiment, the processor subsystem 1342 may include one or more of a digital signal processor (DSP), microprocessor (e.g., RISC core(s) such as ARM core), field-programmable gate array, GPU, or plurality of processing components mounted on one or more substrates (e.g., printed circuit board). The processor subsystem/CPU 1342 may also comprise an internal cache memory (e.g., L1/L2/L3 cache). The processor subsystem is in communication with a memory subsystem 1354, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 1342 is configured to execute at least one computer program stored in program memory 1354 (e.g., a non-transitory computer readable storage medium). A plurality of computer programs/firmware are used and are configured to perform various functions such as communication with relevant functional modules within the CPE/FWA 303 such as the radio head and WLAN/BLE module 1324.

Various other functions useful for and typical in "radio head" electronics including baseband management (e.g., transmit and receive functions via the baseband processor 1356 and associated Tx and Rx chains of the RF front end 1348. For example, in one embodiment, the Tx and Rx chains are part of an RF front end used for OFDM-based RF communication with CBSD devices (e.g., xNB 301 operating as CBRS base stations deployed by the MSO or a third party, so as to provide backhaul).

In the exemplary embodiment, the memory subsystem 1354 includes a Node Manager (NM) process or logic module 1321 configured to support out-of-coverage service provision functionality and protocols such as those described according to FIGS. 3A-5B. For instance, in one implementation (secondary CPE/FWA role), the NM 1321 includes the necessary logic and functionality to (i) access data within e.g., memory 1354 or the mass storage device relating to known other CPE/FWA 303; (ii) if no other CPE/FWA are known a priori to the out-of-coverage CPE/FWA, initiate a search (e.g., via D2D discovery protocols) for the same; (iii) establish a D2D connections to one or more of the other CPE/FWA; (iv) request data/bandwidth from the other device(s); and (v) determine during operation if the CPE/FWA TP is lower than a prescribed SLA (e.g., via an installed iPerf client 317) and if so, request supplementation from another primary CPE as in FIG. 12.

The NM logic 1321 may also be configured to enable different D2D roles or modes for the device, even within the same context (e.g., as a primary or secondary CPE). For instance, in one configuration, the NM logic 1321 may allow a device 303 to operate either in Model A or B, Type 1 or 2B, and/or Mode 1 or 2 D2D configurations as previously described depending on operational conditions, primary context (i.e., being "in network" or "out-of-network"), network policies or rules, or any number of other factors.

Moreover, since the physical channel dynamics for a given CPE/FWA may change over time (whether increase or decrease) such as due to new xNB install or extant xNB removal, growth of trees, introduction of other interferers, etc. over time, each CPE/FWA 303 installed is in the exemplary embodiment configured to enable dynamic switching between as either a receiving device (i.e., out-of-coverage device) or a provider (i.e., in-coverage or high-TP device) at any given time as previously noted, and/or dynamic D2D protocol switching (e.g., from Type 2B to Type 1).

Additionally, the present disclosure contemplates utilization of e.g., primary CPE/FWA 303a in conjunction with other relay or supplementation functions, including those described in co-owned and co-pending U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," incorporated herein by reference in its entirety. For instance, a primary CPE 303a may both (i) supplement another "in network" (but low TP) CPE/FWA 303*b*, and (ii) provide service to an out-of-network CPE 303*c*. As another example, in cases where the high-TP primary CPE is limited and can only feasibly support either supplementation of another primary CPE or provision of services to a secondary CPE (including putatively some with no service to begin with), the logic of the NM 1321 may cause the high-TP CPE to always preferentially service the secondary CPE. Various other possible service scenarios and combinations of primary/secondary CPE use cases and applications will be appreciated by those of ordinary skill given the present disclosure.

As shown, the CPE/FWA 303 also includes the previously described ProSe logic module 1323 for 3GPP D2D communication support, as well as STCP stack logic 1327 to implement e.g., the packet management and related functions (including STCP packet aggregation and mux/demux) as described with respect to FIGS. 10-11.

Service Provider Network—

Figure 14:
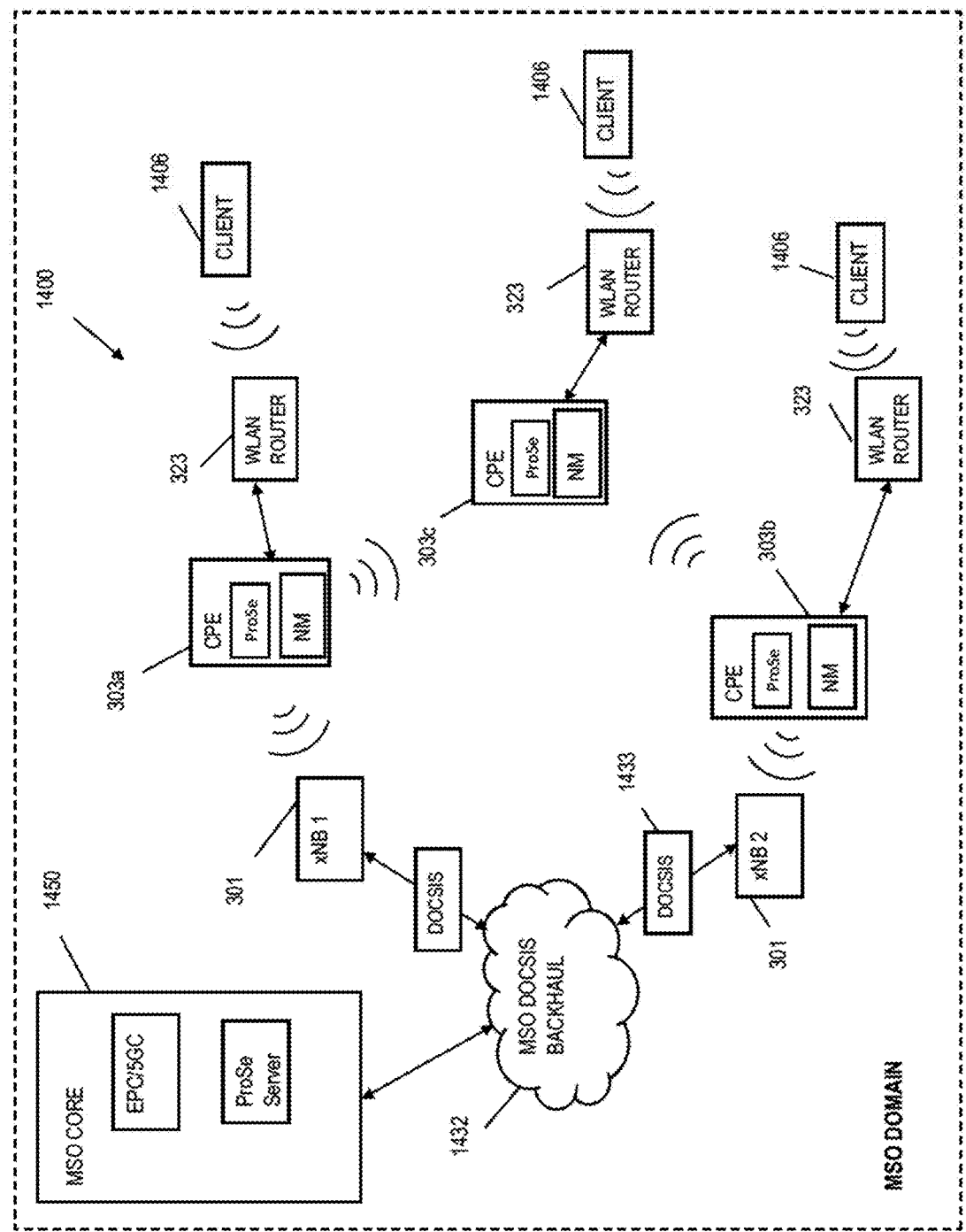
FIG. 14 is a functional block diagram of an exemplary network architecture useful in conjunction with various principles described herein, wherein the 3GPP core and ProSe functions are integrated within one service provider (e.g., MSO) network core.

FIG. 14 illustrates one embodiment of a service provider network configuration useful with the out-of-network service provision functionality and supporting 3GPP/CBRS-based wireless network(s) described herein. It will be appreciated that while described with respect to such network configuration, the methods and apparatus described herein may readily be used with other network types and topologies, whether wired or wireless, managed or unmanaged.

The exemplary service provider network 1400 is used in the embodiment of FIG. 14 to provide backbone and Internet access from the service provider's wireless access nodes (e.g., CBSD/xNBs, Wi-Fi APs, FWA devices or base stations operated or maintained by the MSO), and one or more stand-alone or embedded cable modems (CMs) 1433 in data communication therewith.

The individual xNBs 301 are backhauled by the CMs 1433 to the MSO core via e.g., CMTS or CCAP MHAv2/RPD or other such architecture, and the MSO core 1450 includes at least some of the EPC/5GC core functions previously described, as well as the ProSe Application Server as shown. Each of the primary CPE/FWA 303*a*, 303*b* are communicative with their respective xNBs 301, as well as potentially secondary CPE/FWA as needed to support the relay/service provision functions previously described. Client devices 1406 such as tablets, smartphones, SmartTVs, etc. at each premises are served by respective WLAN routers 323, the latter which are backhauled to the MSO core or backbone via their respective CPE/FWA.

Notably, in the embodiment of FIG. 14, all of the necessary components for support of the OON service functionality are owned, maintained and/or operated by the common entity (e.g., cable MSO). The approach of FIG. 14 has the advantage of, inter alia, giving the MSO complete control over the entire service provider chain, including control over the xNBs so as to optimize service to its specific customers (versus the non-MSO customer-specific service provided by an MNO), and the ability to construct its architecture to optimize incipient 5G NR functions such as network slicing, gNB DU/CU Option "splits", etc.

Figure 15:
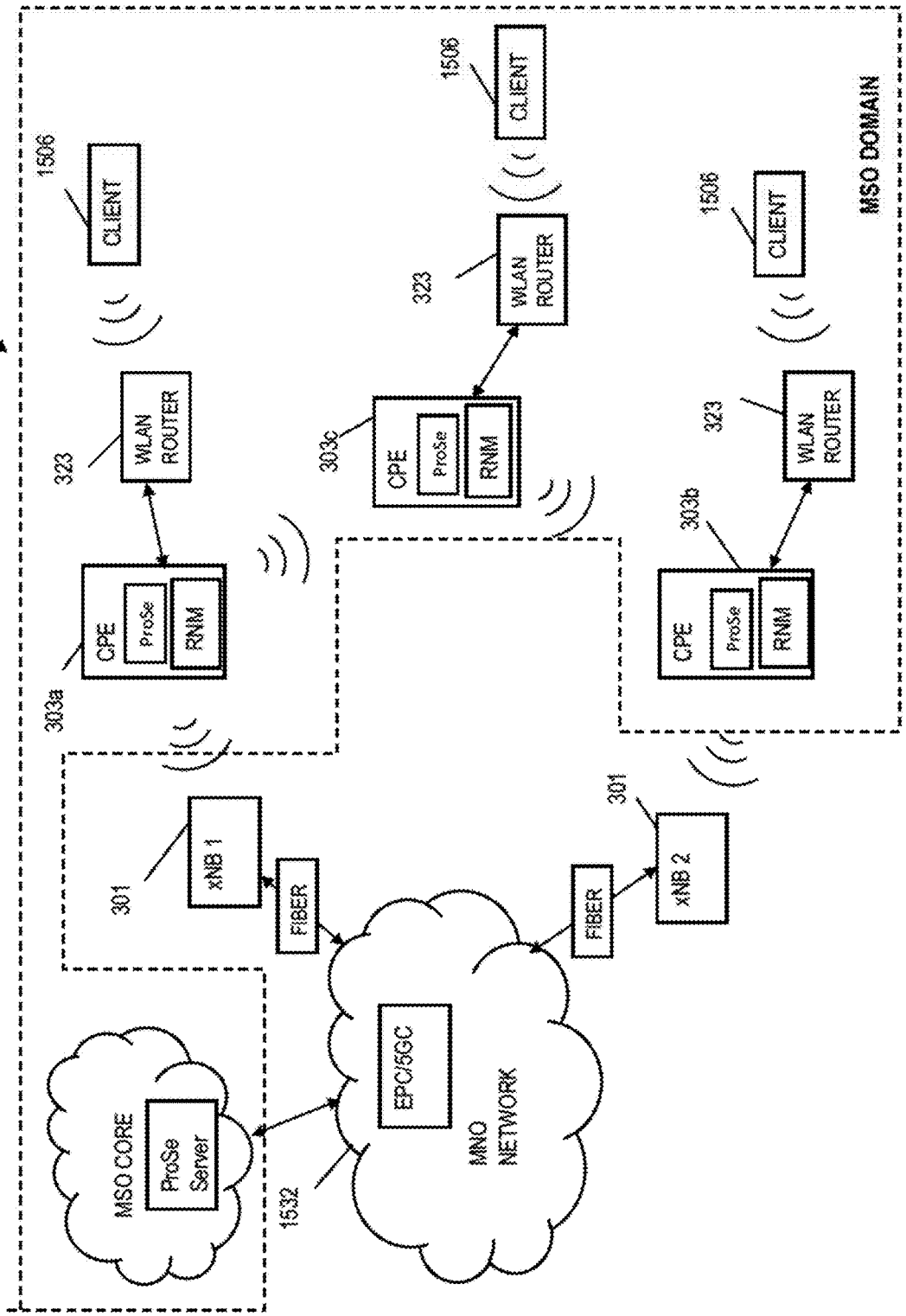
FIG. 15 is a functional block diagram of an exemplary network architecture useful in conjunction with various principles described herein, wherein the 3GPP core functions are integrated within a third party service provider (e.g., MNO) network that is in contact with an MSO core.

In contrast, in the embodiment of FIG. 15, the architecture 1500 is divided among two or more entities, such as an MNO and an MSO. As shown, the MSO service domain extends only to the CPE/FWA and served premises and the MSO core functions, while other functions such as 3GPP EPC/E-UTRAN or 5GC and NG-RAN functionality is provided by one or more MNO networks 1532 operated by MNOs with which the MSO has a service agreement. In this approach, the ProSe Application server is still maintained and operated by the MSO (since the MSO maintains cognizance over the CPE/FWA which must communicate via ProSe), although this is not a requirement, and the present disclosure contemplates embodiments where the ProSe function is maintained by the MNO or even a third party. The approach of FIG. 15 has the advantage of, inter alia, avoiding more CAPEX by the MSO, including duplication of infrastructure which may already service the area of interest, including reduced RF interference due to addition of extra (and ostensibly unnecessary) xNBs or other transceivers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a first fixed wireless access (FWA) device that is outside a coverage area of a wireless network, the method comprising:
    identifying a second FWA device within the coverage area of the wireless network and capable of providing resources to the first FWA device, the identifying comprising determining that a data rate associated with the second FWA device exceeds a prescribed threshold or requirement, the prescribed threshold or requirement enabling selection of the second FWA device from a plurality or potential candidate FWA devices;
    causing establishment of a wireless connection to the identified second FWA device;
    transacting data with the second FWA device in order to cause provision of the resources to the first FWA device from the wireless network via at least the second FWA device;
    subsequent to receipt of the resources at the first FWA device, conducting, at the first FWA device, an evaluation to determine an additional capacity that is required to be provided to the first FWA device;
    receiving data from respective ones of a plurality of other FWA devices, the received data indicating a respective additional capacity capability; and based at least on the received data and the determined required additional capacity, selecting at least one other FWA device from the plurality of other FWA devices with which to establish a wireless connection.

2. The computerized method of claim 1, further comprising causing discovery of the first FWA device that is outside the coverage area of the wireless network, wherein the causing the discovery comprises utilizing a 3GPP (Third Generation Partnership Project)-based D2D (device-to-device) protocol.

3. The computerized method of claim 2, wherein the utilizing of the 3GPP-based D2D protocol is based on a Type 2B D2D semi-persistent UE-specific allocation configuration.

4. The computerized method of claim 2, wherein the utilizing of the 3GPP-based D2D protocol is based on a schedule provided to the first FWA device by at least one base station.

5. A computerized method of operating a first fixed wireless access (FWA) device that is outside a coverage area of a wireless network, the method comprising;
identifying a second FWA device within the coverage area of the wireless network and capable of providing resources to the first FWA device, the identifying comprising evaluating data regarding ones of a plurality of other FWA devices within wireless range of the first FWA device such that an inter-device connection can be established therebetween;
causing establishment of a wireless connection to the identified second FWA device; and
transacting data with the second FWA device in order to cause provision of the resources to the first FWA device from the wireless network via at least the second FWA device;
wherein the establishment of the inter-device connection comprises using 3GPP (Third Generation Partnership Project) D2D (device to device) protocols between the first FWA device and at least one other FWA device of the plurality of other FWA devices, the D2D protocols comprising at least synchronization within a CBRS (Citizens Broadband Radio Service) radio frequency band.

6. Computerized apparatus, comprising:
at least one wireless interface;
processor apparatus in data communication with the at least one wireless interface; and
storage apparatus in data communication with the processor apparatus, the storage apparatus comprising at least one computer program comprising a plurality of instructions that is configured to, when executed by the processor apparatus, cause the computerized apparatus to:
identify at least one fixed wireless access (FWA) device within a coverage area of a wireless network, and within wireless range of (i) the at least one wireless interface of the computerized apparatus and (ii) at least one base station;
engage in communication with the at least one FWA device via utilization of a direct synchronization and discovery protocol;
obtain first data from the at least one FWA device, the first data enabling establishment of a first wireless connection between the computerized apparatus and the at least one FWA device;
cause the establishment of the first wireless connection between the computerized apparatus and the at least one FWA device;
transact data with the at least one FWA device via the first wireless connection in order to cause receipt of resources from the wireless network from the at least one FWA device, the transaction of the data comprising utilization of the at least one FWA device to request a resource grant via use of the at least one base station; and
based at least on a determination that a criterion relating to a performance or capability of the at least one FWA device is exceeded, receive the resources in accordance with the resource grant from the at least one FWA device.

7. The computerized apparatus of claim 6, wherein the engagement in the communication with the at least one FWA device via the utilization of the direct synchronization and discovery protocol comprises utilization of a 3rd Generation Partnership Project (3GPP) D2D (device to device) protocol based on a schedule provided to at least the at least one FWA device by the at least one base station.

8. The computerized apparatus of claim 6, wherein the engagement in the communication with the at least one FWA device via the utilization of the direct synchronization and discovery protocol comprises utilization of a 3rd Generation Partnership Project (3GPP) D2D (device to device) protocol based on a discovery protocol initiated by the computerized apparatus.

9. The computerized apparatus of claim 6, wherein the computerized apparatus and the at least one FWA device each comprise a FWA (fixed wireless access) device configured to operate in a CBRS (citizens broadband radio service) frequency band, and the at least one base station comprises a 3rd Generation Partnership Project (3GPP)-compliant NodeB (NB) configured to operate in a CBRS frequency band.

10. The computerized apparatus of claim 6, wherein the at least one computer program is further configured to, when executed by the processor apparatus, cause the computerized apparatus to:
determine that the first wireless connection cannot meet a prescribed performance level requirement associated with the computerized apparatus based on the resources received from the at least one FWA device; and
based at least on the determination, cause a data communication with at least one second wireless access device within wireless range of the computerized apparatus to request supplementation of the first wireless connection via a second wireless connection, the data communication to request supplementation comprising data relating to an amount of bandwidth supplementation required by the computerized apparatus.

11. The computerized apparatus of claim 10, wherein the at least one computer program is further configured to, when executed by the processor apparatus, cause the computerized apparatus to:
utilize a transport layer process to enable aggregation of data packets transmitted to the computerized apparatus via the first wireless connection and the second wireless connection.

12. The computerized apparatus of claim 10, wherein the determination that the first wireless connection cannot meet the prescribed performance level requirement comprises determination of the amount of the bandwidth supplementation required by the computerized apparatus by a performance determination process operative to execute on the computerized apparatus, the performance determination process configured to measure at least one parameter related to at least one of data rate or throughput of the at least one wireless interface via use of first wireless connection.

13. The computerized apparatus of claim 10, wherein the first wireless connection and the second wireless connection each comprise operation in a 3rd Generation Partnership Project (3GPP) RRC_Connected state.

14. Computer readable apparatus comprising a non-transitory storage medium, the non-transitory medium comprising at least one computer program having a plurality of instructions, the plurality of instructions configured to, when executed on a digital processing apparatus of a computerized apparatus, cause the computerized apparatus to:
    identify a first computerized premises apparatus within the coverage area of a wireless network and capable of providing first wireless resources to a second computerized premises apparatus, the first wireless resources comprising time-frequency resources;
    cause establishment of a first wireless connection between the first computerized premises apparatus and the second computerized premises apparatus; and
    cause, via at least the first wireless connection, the first computerized premises apparatus to provide the first wireless resources from the wireless network to the second computerized premises apparatus;
wherein:
    (i) the identification of the first computerized premises apparatus comprises:
        receipt of first data relating to a measurement of at least one first performance metric relating to a second wireless connection between the first computerized premises apparatus and a base station apparatus, the second wireless connection used to provide the first wireless resources to the first computerized premises apparatus; and
        determination, based at least on the first data, that the at least one performance metric exceeds a first prescribed threshold;
    (ii) the causation of the establishment the first wireless connection between the first computerized premises apparatus and the second computerized premises apparatus is based at least on the determination that the at least one performance metric exceeds the first prescribed threshold; and
    (iii) the first wireless connection comprises an OFDM (orthogonal frequency division multiplex)-based connection.

15. Computer readable apparatus comprising a non-transitory storage medium, the non-transitory medium comprising at least one computer program having a plurality of instructions, the plurality of instructions configured to, when executed on a digital processing apparatus of a computerized apparatus, cause the computerized apparatus to:
    identify a first computerized premises apparatus within the coverage area of a wireless network and capable of providing first wireless resources to a second computerized premises apparatus;
    cause establishment of a first wireless connection between the first computerized premises apparatus and the second computerized premises apparatus;
    cause, via at least the first wireless connection, the first computerized premises apparatus to provide the first wireless resources from the wireless network to the second computerized premises apparatus;
    receive first data relating to a measurement of at least one first performance metric relating to the first wireless connection;
    receive second data relating to a measurement of at least one second performance metric relating to a second wireless connection between a third computerized premises apparatus and a base station apparatus; and
    based at least on (i) the first data indicating that the at least one first performance metric does not meet a first prescribed threshold, and (ii) the second data indicating that the at least one second performance metric exceeds a second prescribed threshold, cause establishment of a third wireless connection between the first computerized premises apparatus and the third computerized premises apparatus, the third wireless connection utilized for a provision of second wireless resources to the second computerized premises apparatus, the second wireless resources supplementing the first wireless resources such that the least one first actual performance metric at least meets or exceeds the first prescribed threshold.

16. The computer readable apparatus of claim 15, wherein:
    the second computerized premises apparatus comprises a fixed wireless access (FWA) device that is (i) completely out of a coverage area of the base station apparatus and the third computerized premises apparatus, and (ii) configured to operate in a CBRS (citizens broadband radio service) frequency band; and
    the base station apparatus comprises a 3rd Generation Partnership Project (3GPP)-compliant NodeB (NB) configured to operate in the CBRS frequency band.

17. The computer readable apparatus of claim 15, wherein the first, second, and third wireless connections each comprise operation in a 3rd Generation Partnership Project (3GPP) RRC_Connected state.

18. Computer readable apparatus comprising a non-transitory storage medium, the non-transitory storage medium comprising at least one computer program having a plurality of instructions, the plurality of instructions configured to, when executed on a digital processing apparatus of a first fixed wireless access (FWA) device that is outside a coverage area of a wireless network, cause the first FWA device to:
    identify a second FWA device within the coverage area of the wireless network and capable of providing resources to the first FWA device, the identification comprising an evaluation of data regarding ones of a plurality of other FWA devices within wireless range of the first FWA device;
    establish a wireless inter-device connection to the identified second FWA device; and
    transact data with the second FWA device in order to cause provision of the resources to the first FWA device from the wireless network via at least the second FWA device;
    wherein the establishment of the wireless inter-device connection comprises use of at least one 3GPP (Third Generation Partnership Project) D2D (device to device) protocol between the first FWA device and at least the second FWA device, the at least one D2D protocol comprising at least synchronization within a CBRS (Citizens Broadband Radio Service) radio frequency band.

19. The computer readable apparatus of claim 18, wherein the plurality of instructions are further configured to, when executed on the digital processing apparatus, cause the first FWA device to:

receive data from the identified second FWA device, the received data relating to at least one spectrum grant; and utilize the received data relating to the at least one spectrum grant in the establishment of the inter-device wireless connection.

20. The computer readable apparatus of claim 19, wherein:

the establishment of the inter-device wireless connection to the identified second FWA device comprises causation of data representative of a request to be issued to a SAS (spectrum allocation system) in data communication with the wireless network to obtain the at least one spectrum grant; and at least one frequency within the at least one spectrum grant is utilized to establish the inter-device wireless connection.

21. The computer readable apparatus of claim 20, wherein the causation of the data representative of a request to be issued to the SAS comprises causation of the data representative of the request to be initiated from the second FWA device.

22. The computer readable apparatus of claim 18, wherein the plurality of instructions are further configured to, when executed on the digital processing apparatus, cause the first FWA device to:

cause discovery of the first FWA device by at least some of the plurality of other FWA devices, the causation of the discovery of the first FWA device comprising:

causation of at least one of the first FWA device or the second FWA device to transmit an announcement, the announcement configured to indicate to the at least some of the plurality of other FWA devices that the at least first or second FWA device exists; and based at least on receipt of at least one response to the announcement, causation of the first FWA device to send data to the at least one second FWA device for establishment of the wireless connection.

* * * * *